(12) United States Patent
Kaneda

(10) Patent No.: US 8,537,430 B2
(45) Date of Patent: Sep. 17, 2013

(54) IMAGE FORMING APPARATUS AND CONTROL METHOD THEREOF

(75) Inventor: Kanako Kaneda, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 408 days.

(21) Appl. No.: 12/917,818

(22) Filed: Nov. 2, 2010

(65) Prior Publication Data

US 2011/0134493 A1 Jun. 9, 2011

(30) Foreign Application Priority Data

Dec. 4, 2009 (JP) ................................ 2009-277040

(51) Int. Cl.
*H04N 1/04* (2006.01)
*G06K 9/36* (2006.01)

(52) U.S. Cl.
USPC ........................................ 358/474; 382/289

(58) Field of Classification Search
USPC .................. 358/474, 1.9; 382/172, 309, 289, 382/281, 296
See application file for complete search history.

(56) References Cited

U.S. PATENT DOCUMENTS

| | | | |
|---|---|---|---|
| 7,016,552 B2* | 3/2006 | Koyama | 382/289 |
| 7,277,584 B2 | 10/2007 | Nakanishi et al. | |
| 7,317,833 B2 | 1/2008 | Kaneda | |
| 8,340,137 B2* | 12/2012 | Chen et al. | 370/516 |
| 2001/0055120 A1* | 12/2001 | Sawada et al. | 358/1.9 |
| 2004/0105451 A1* | 6/2004 | Boduch et al. | 370/401 |
| 2006/0132512 A1* | 6/2006 | Walmsley et al. | 347/5 |
| 2007/0079105 A1* | 4/2007 | Thompson | 711/201 |
| 2009/0052802 A1* | 2/2009 | Curtis | 382/289 |
| 2009/0324080 A1 | 12/2009 | Yamazaki et al. | |
| 2010/0271646 A1* | 10/2010 | Morimoto et al. | 358/1.9 |
| 2010/0306603 A1* | 12/2010 | Chen et al. | 714/700 |
| 2011/0085186 A1* | 4/2011 | Yi | 358/1.9 |
| 2011/0135362 A1* | 6/2011 | Cho | 399/372 |
| 2011/0235946 A1* | 9/2011 | Hosier et al. | 382/309 |
| 2012/0030438 A1* | 2/2012 | Shafai et al. | 711/159 |
| 2012/0106844 A1* | 5/2012 | Ramachandrula et al. | 382/173 |

FOREIGN PATENT DOCUMENTS

JP 2004-170755 6/2004

* cited by examiner

*Primary Examiner* — Jerome Grant, II
(74) *Attorney, Agent, or Firm* — Fitzpatrick, Cella, Harper & Scinto

(57) ABSTRACT

An image forming apparatus for forming an image by performing exposure scanning of an image carrier is provided. The apparatus includes: a unit for storing image data having a height in a sub-scanning direction equivalent to a certain number of amounts of the image data obtained by a single main scan; a unit for, in a case where a block in which is located a scan line of image data that is the scanning target has moved in a sub-scanning direction, storing a block position and a moving direction; a unit for, based on the skew information, converting image data of the main scan line and outputting an amount of image data that is obtained by a single main scan; and a unit for, when a block unit has been processed, replacing the processed block unit with another block unit.

6 Claims, 19 Drawing Sheets

FIG. 9

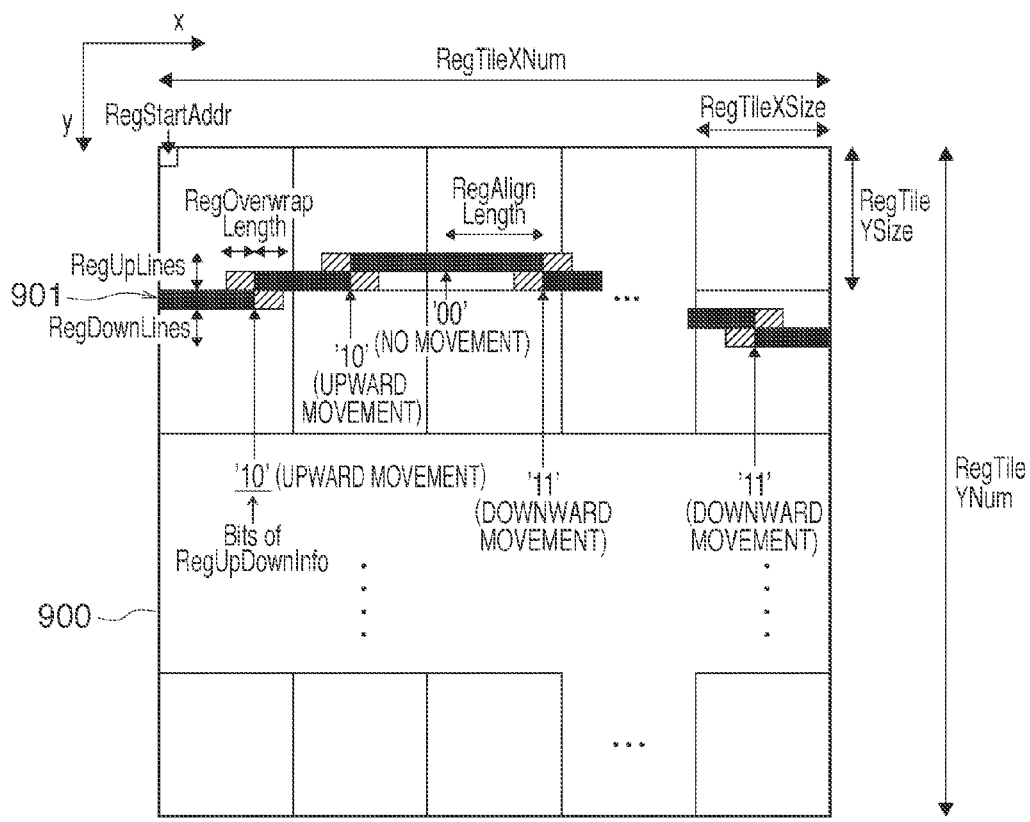

INFORMATION RELATING TO TILE IMAGE DATA
  RegStartAddr    : PAGE START ADDRESS
  RegTileXSize    : X SIZE OF TILE
  RegTileYSize    : Y SIZE OF TILE
  RegTileXNum     : NUMBER OF TILES IN X DIRECTION
  RegTileYNum     : NUMBER OF TILES IN Y DIRECTION INFORMATION RELATING TO SKEW OF SCAN LINE
  RegAlignLength    : INTERVAL BETWEEN SKEW POINTS
  RegOverwrapLength : LENGTH OF OVERWRAP
  RegUpDownInfo( )  : SPECIFICATION OF SKEW (00, 10, 11)
                      (SKEW INFORMATION OF EACH SKEW POINT
                       IS PACKED)
  RegUpLines        : MAXIMUM MOVEMENT LINE COUNT
                       IN UPWARD DIRECTION
  RegDownLines      : MAXIMUM MOVEMENT LINE COUNT
                       IN DOWNWARD DIRECTION

IMAGE FORMING APPARATUS AND CONTROL METHOD THEREOF

BACKGROUND OF THE INVENTION

1. Field of the Invention

The present invention relates to image forming technology for forming an image by an electrophotographic method.

2. Description of the Related Art

In recent years, a tandem system is being increasingly employed to improve the image-forming speed of color image forming apparatuses that utilize an electrophotographic method. According to this system, the color image forming apparatus is provided with the same number of developers and photosensitive drums as the number of color materials, and forms a color image by sequentially transferring images of different colors onto a conveyance belt or printing medium. With a color image forming apparatus employing this tandem system, multiple factors are known to cause registration errors at the image forming units of each color. Various solutions have been proposed for the respective factors.

Such factors include unevenness between the lenses of a deflecting scanning device, displacement when attaching the image forming unit, and displacement when mounting the deflecting scanning device to the main body of the color image forming apparatus. Due to such factors, an inclination or skew arises in the scan lines. Since the extent of inclination or skewing differs for each color, registration errors occur. Japanese Patent Laid-Open No. 2004-170755 discloses a method for dealing with this kind of registration error. According to this method, the size of the inclination and skew of a scan line is measured using an optical sensor, bitmap image data is corrected so as to cancel out the inclination and skew, and an image is formed based on the corrected image data. This method does not require a mechanical adjustment member or an adjustment process during assembly, since registration errors are corrected by processing image data electrically. Consequently, registration errors can be dealt with at a low cost.

However, according to the method disclosed in Japanese Patent Laid-Open No. 2004-170755, a line buffer is required in order to perform blend processing with respect to the adjacent line above or below the current line at a skew portion of the scan line. The required capacity of the line buffer depends on the skew width of the scan line. For example, if the skew width of the scan line spans N lines of bitmap image data, a line buffer that can store N lines of image data is required. Since the value of N varies for each color image forming apparatus, the capacity of a line buffer mounted in each apparatus must correspond to a number of lines that exceeds the maximum value of such variance. The capacity of the line buffer consequently increases, and the circuitry size is also increased, leading to a rise in costs.

Further, although the method disclosed in Japanese Patent Laid-Open No. 2004-170755 implements skew correction for bitmap image data, no mention is made with respect to a case of dealing with tile image data. The term "tile image data" refers to data obtained by dividing an image represented by the image data into a plurality of tile shapes. In comparison to bitmap data for an entire image, simultaneous parallel processing and rotational processing can be performed more efficiently when using tile image data. The transfer efficiency of image data can also be improved by compressing tile image data. However, when handling tile image data, the conventional method that corrects skewing for bitmap image data unfortunately cannot be applied directly to tile image data. The present invention solves the aforementioned conventional problem.

SUMMARY OF THE INVENTION

An aspect of the present invention provides an image forming apparatus that can correct a skew of a scan line and form an image while reducing the capacity of a memory used for correcting the skew of a main scan line, as well as a control method of the image forming apparatus.

According to one aspect of the present invention, an image forming apparatus for forming an image by performing exposure scanning of an image carrier, comprises: an image memory configured to store image data in block units obtained by dividing image data into a plurality of blocks; a skew storing unit configured to store skew information that indicates a skew with respect to the image carrier of a main scan line used in the exposure scanning; a storage unit configured to store image data having a height in a sub-scanning direction equivalent to a certain number of amounts of the image data obtained by a single main scan; a readout unit configured to specify a block in which is located a scan line of image data that is a scanning target that is stored in the image memory and to read out image data that is stored in the image memory in block units in accordance with the skew information; a storing unit configured to, in a case where a block in which is located a scan line of image data that is the scanning target has moved in a sub-scanning direction when storing image data in block units that is read out by the readout unit to the storage unit, store information indicating a block position to which the block has moved and a moving direction of the block at the block position; an output control unit configured to read out a block of image data stored in the storage unit in a main scanning direction, adjust a position in the sub-scanning direction of image data of the scan line based on the information stored in the storing unit and, based on the skew information stored in the skew storing unit, convert image data of the main scan line and output an amount of image data that is obtained by a single main scan; an exposure unit configured to expose the image carrier with irradiation light in accordance with the image data of an amount obtained by a single main scan that is output by the output control unit; and a replacing unit configured to, when a block unit of image data stored in the storage unit is output by the output control unit and has been processed, replace the processed block unit of image data with another block unit of image data that is read out from the image memory by the readout unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 9 is a view that illustrates skew information of a scan line and tile image data according to the embodiment;

DESCRIPTION OF THE EMBODIMENTS

Embodiments of the present invention will now be described in detail with reference to the accompanying drawings. The following embodiments are not intended to limit the scope of the present invention as described in the claims, and not all combinations of features described in the embodiments are essential to the solving means of the present invention. First, the apparatus configuration that implements each embodiment of the present invention is described.

Figure 1:
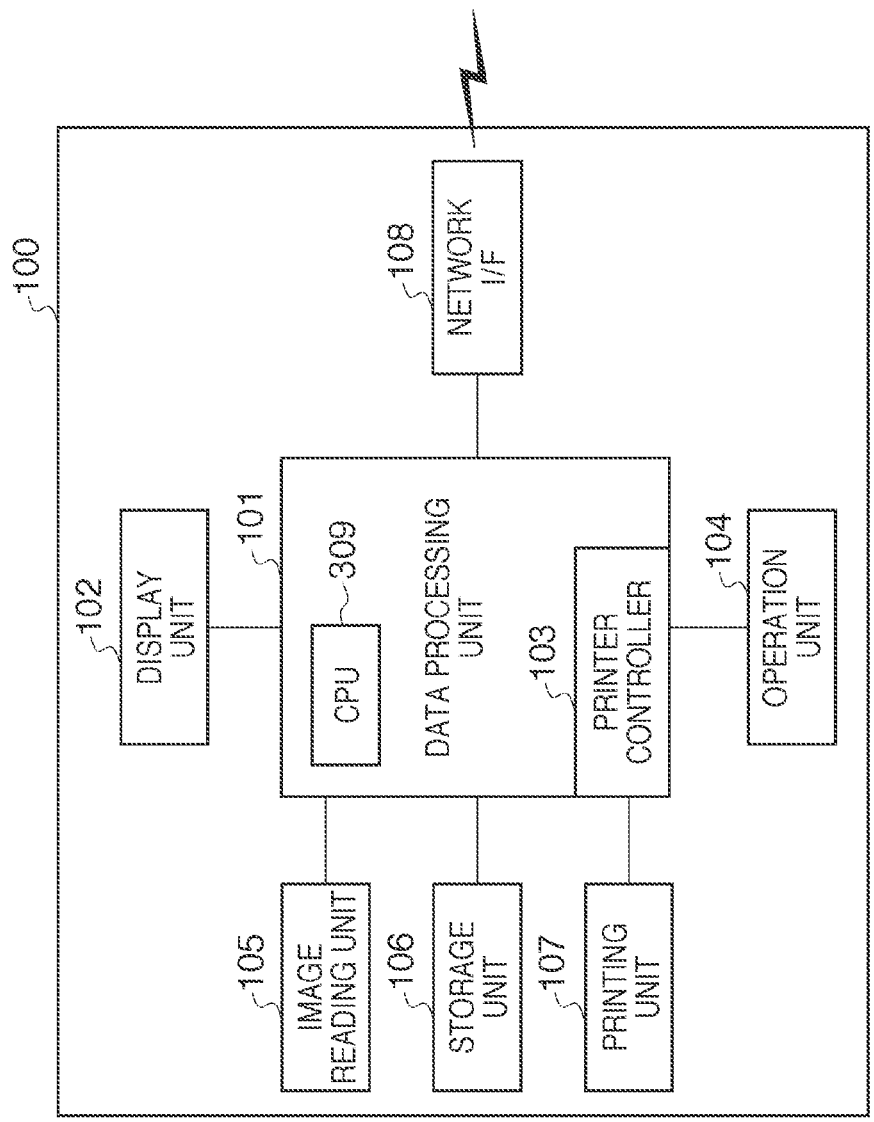
FIG. 1 is a block diagram illustrating an exemplary configuration of an image forming apparatus according to an embodiment of the present invention.

FIG. 1 is a block diagram illustrating an exemplary configuration of an image forming apparatus according to an embodiment of the present invention.

An image forming apparatus 100 is, for example, implemented by an MFP (Multi Function Peripheral) that implements multiple kinds of functions. The image forming apparatus 100 is connected to a network through a network I/F 108, and is capable of communicating image data and apparatus information with other devices utilizing the network.

The image forming apparatus 100 includes an image reading unit 105 that includes an original platen and an automatic document feeder (ADF). The image reading unit 105 irradiates a bundle of originals or a single original with light from a light source (not shown), and provides a reflected image from the original on a solid-state, image-sensing element by means of a lens. Thus, the image reading unit 105 acquires an image-read signal in a raster shape from the solid-state, image-sensing element as a raster image of a predetermined density (for example, 600 dpi). Although an example is described hereafter in which a paper document is taken as a printed material that is read with the image reading unit 105, the printed material read by the image reading unit 105 may be a printing medium other than paper (for example, a transparent original such as an OHP sheet or a film, or cloth). The image forming apparatus 100 also has a copy function for printing an image corresponding to an image-read signal on a printing medium with a printing unit 107. In particular, when making only a single copy of an original image, a printer controller 103 subjects the image-read signal to image processing at a data processing unit 101 to generate a recording signal, and the printing unit 107 that receives the recording signal carries out printing on a printing medium. In contrast, when making a plurality of copies of an original image, the printer controller 103 causes a storage unit 106 to temporarily store the recording signal, and thereafter outputs the recording signal sequentially to the printing unit 107 to print the designated number of copies. Various kinds of print control using the printing unit 107 are implemented by the printer controller 103. Operator instructions to the image forming apparatus 100 are input from an operation unit 104 mounted on the image forming apparatus 100, and the series of operations corresponding thereto are controlled by a CPU 309 of the data processing unit 101. In addition, a display unit 102 displays the state of the input operation as well as the state of the image data during processing. In the image forming apparatus 100, a user interface that provides a user with the ability to instruct the performing of various operations and displays, for executing, various kinds of processing as described later, is implemented by the display unit 102 and the operation unit 104.

Figure 2:
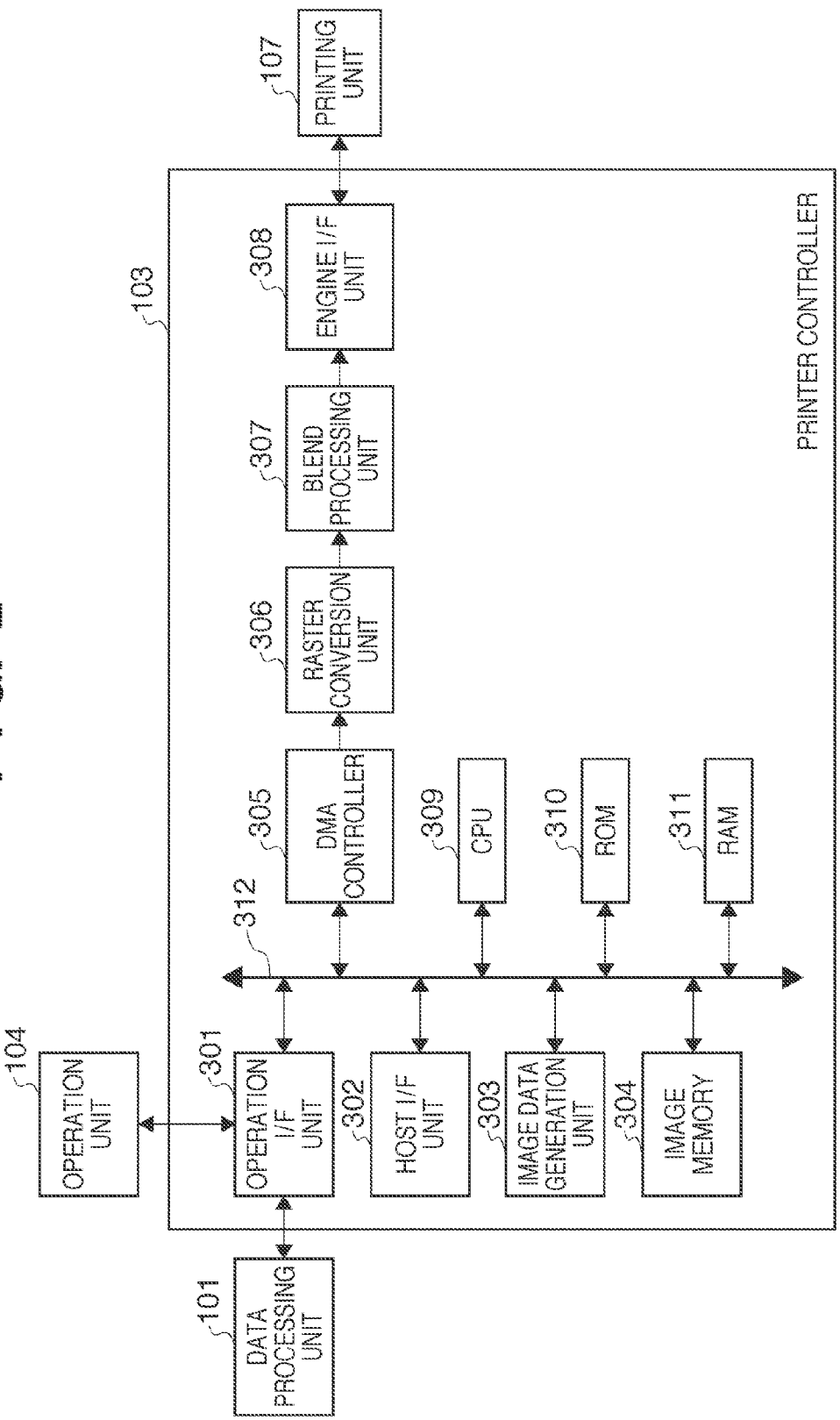
FIG. 2 is a block diagram of an exemplary printer controller according to the embodiment of the present invention.

Next, an exemplary detailed configuration of the printer controller 103 is described using FIG. 2. FIG. 2 is a view that illustrates an exemplary detailed configuration of the printer controller according to this embodiment of the present invention.

The printer controller 103 has a host I/F unit 302. The host I/F unit 302 comprises an input buffer (not shown) into which print data delivered from the data processing unit 101 and settings that designate the operations of the image forming apparatus are input. The host I/F unit 302 also comprises an output buffer (not shown) that temporarily stores output data including signals to be delivered to the data processing unit 101 and device information data. The host I/F unit 302 not only functions as an input/output unit for transmitting and receiving signals and communication packets to and from the data processing unit 101, but also controls communication with the data processing unit 101. Print data input via the host I/F unit 302 is supplied to an image data generation unit 303. In this case, the print data that is input is, for example, RGB bitmap image data or PDL (Page Description Language) data. The image data generation unit 303 carries out analysis processing (e.g. PDL analysis processing) on the input print data, generates data in an intermediate language based on the result of the analysis, and further generates data that can be processed by the printing unit (printer engine) 107.

More specifically, the image data generation unit 303 analyzes the print data and creates intermediate language information based on the analysis result, and also generates and converts tile image data or bitmap image data, and converts display colors R, G, and B (additive process) included in the print data into colors Y, M, C, and K (subtractive process) that can be processed by the printing unit 107. Further, the image data generation unit 303 converts character code contained in the print data into a font data, such as a data for bit patterns or outline fonts that are stored in advance. Thereafter, the image data generation unit 303 executes a pseudo halftone process on the image data using a dither pattern, to thereby generate image data of a YMCK display for which a printing process can be performed at the printing unit 107.

The tile image data created in this manner is stored in an image memory 304. The tile image data stored in the image memory 304 is read out and transferred by a DMA controller 305. Processing for reading out tile image data from the image memory 304 is controlled by the DMA controller 305 in response to an instruction from the CPU 309. The tile image data that is read out from the image memory 304 is transferred to a raster conversion unit 306 and converted to bitmap image data. Thereafter, blend processing that is described later is performed at a blend processing unit 307, and the resulting data is transferred as a video signal to the printing unit 107 via an engine I/F unit 308. The engine I/F unit 308 comprises an output buffer (not shown) that temporarily stores the video signal to be transferred to the printing unit 107, and an input buffer (not shown) that temporarily stores a signal delivered from the printing unit 107. Further, the engine I/F unit 308 functions as an input/output unit for signals exchanged between the printer controller 103 and the printing unit 107, and also controls communication with the printing unit 107. Various instructions, such as instructions relating to mode settings that are issued by input operations at the operation unit 104, are input via an operation I/F unit 301. The operation I/F unit 301 functions as an interface between the operation unit 104 and the CPU 309.

The CPU 309 performs control of each of the above-described blocks according to a mode designated by the operation unit 104 or the data processing unit 101. The control is executed based on control programs stored in a ROM 310. The control programs stored in the ROM 310 include an OS (operating system) for performing time-sharing control in load module units that are referred to as "tasks" using a system clock. Further, the control programs include a plurality of load modules executed and controlled by the OS on a function-by-function basis. The CPU 309 uses a RAM 311 as a work area for arithmetic processing. Each block including the CPU 309 is connected to a system bus 312. The system bus 312 includes an address bus and a system bus.

Figure 3:
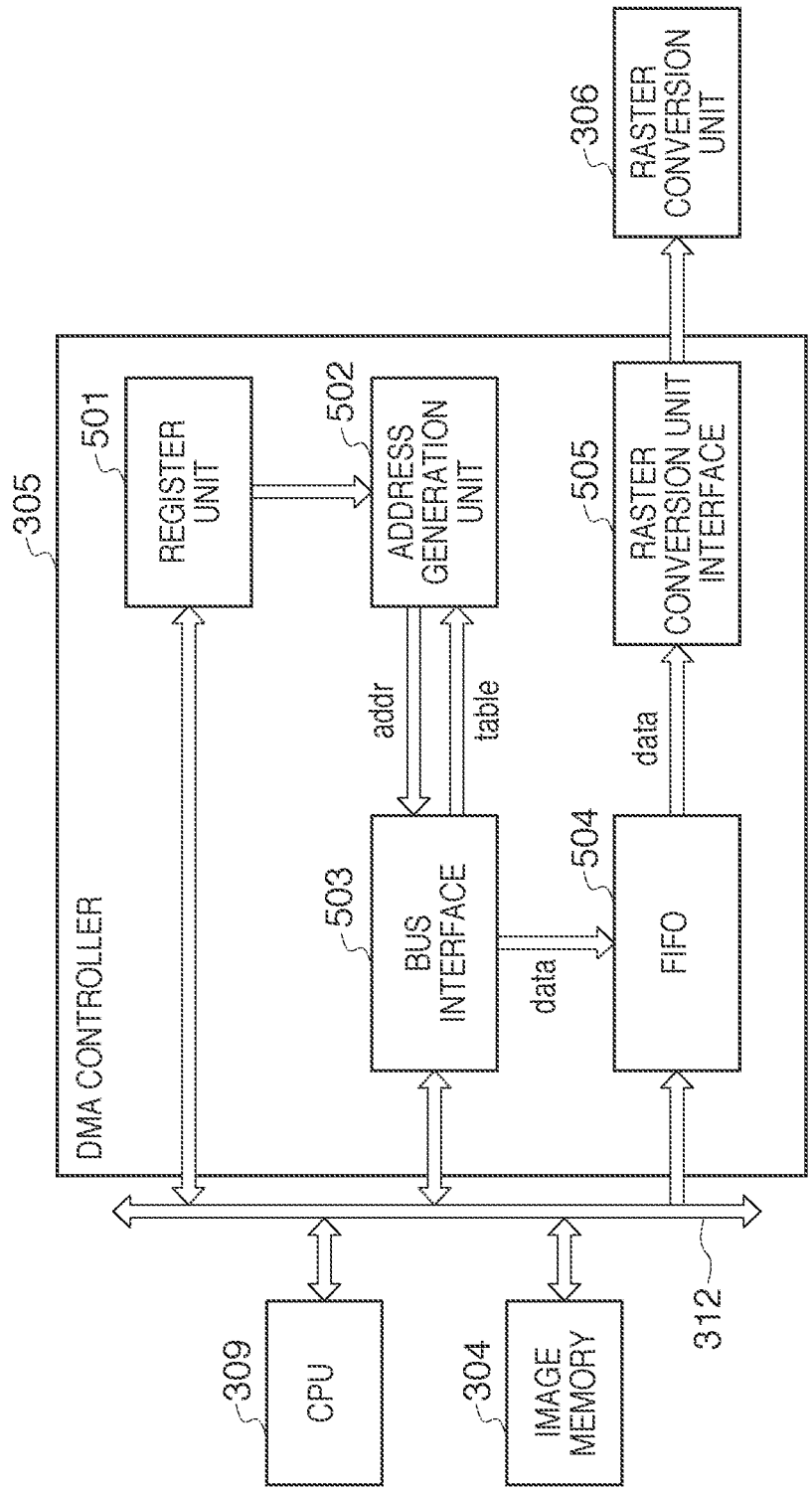
FIG. 3 is a block diagram of an exemplary DMA controller according to the embodiment of the present invention.

Next, an exemplary detailed configuration of the DMA controller 305 is described using FIG. 3. FIG. 3 is a view that illustrates an exemplary detailed configuration of the DMA controller 305 of the printer controller 103 according to this embodiment of the present invention.

A register unit 501 includes a plurality of registers (not shown). The CPU 309 gives an instruction to the DMA controller 305 by writing appropriate values into the respective registers of the register unit 501. An address generation unit 502 generates address data for reading out tile image data stored in the image memory 304. The address data ("addr") is generated by referring to the contents of each register of the register unit 501 and a table for reading out tile image data that is created by the CPU 309. A bus interface 503 receives address data from the address generation unit 502, and issues a read transaction to the system bus 312. For example, if the data bus width of the system bus 312 is 32 bits, the bus interface 503 divides the tile image data ("data") into a plurality of 32-bit accesses, and issues the read transaction. The bus interface 503 receives the address data that is read. If the address data is tile image data, the bus interface 503 writes the data into a FIFO (First-In First-Out) 504, and if the data is table data ("table"), the bus interface 503 sends the data to the address generation unit 502. Tile image data that is read from the image memory 304 is temporarily stored in the FIFO 504. Even if a time period temporarily occurs during which input of data to the raster conversion unit 306 is not possible, the DMA controller 305 stores the tile image data in the FIFO 504. As a result, the tile image data can be immediately supplied from the FIFO 504 to the raster conversion unit 306 when the raster conversion unit 306 is again able to receive data. A raster conversion unit interface 505 sends the tile image data stored in the FIFO 504 to the raster conversion unit 306.

Figure 4:
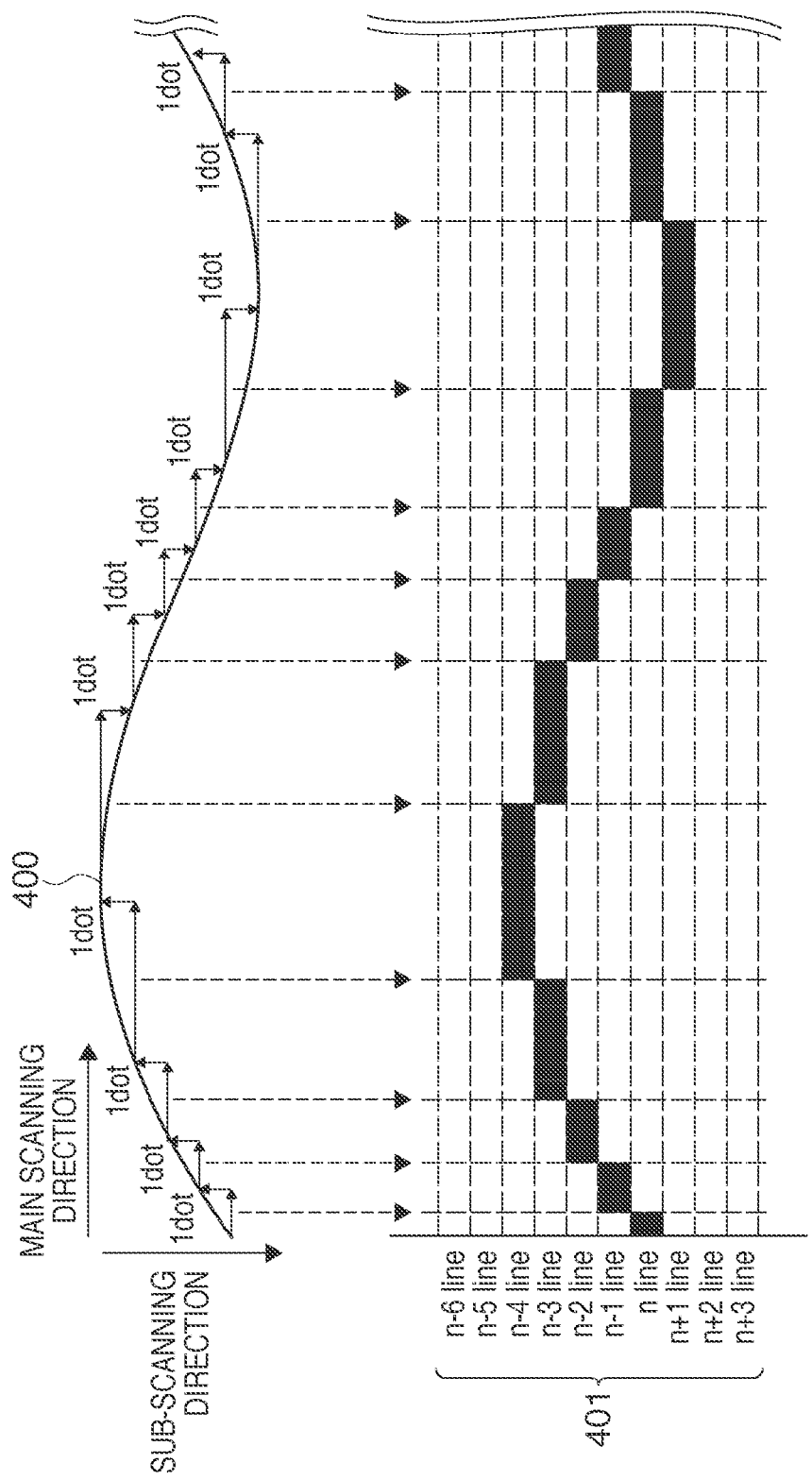
FIG. 4 is a view that illustrates a registration error and the correction thereof.
Figure 5:
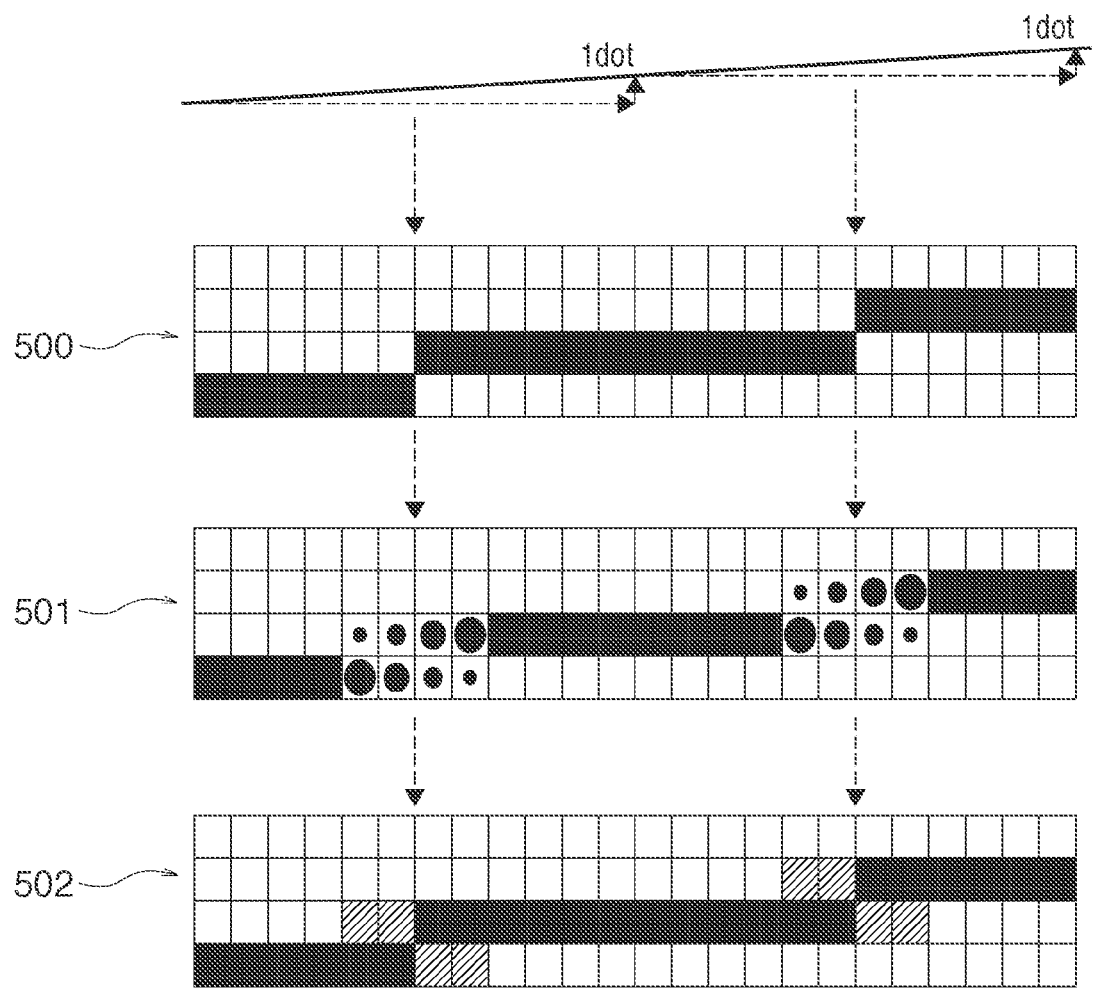
FIG. 5 is a view that illustrates a registration error and the correction thereof.

Next, the principles of registration-error correction are described using FIG. 4 and FIG. 5.

FIG. 4 and FIG. 5 are views for illustrating the principles of registration-error correction according to this embodiment of the present invention.

Reference numeral 400 denotes a main scan line in which a skew has occurred that causes a registration error. Reference numeral 401 denotes a state in which bitmap image data is delivered to the printing unit 107 while switching the line in accordance with the skew of the scan line. In the section denoted by reference numeral 401, the black portions represent data that is delivered to the printing unit 107 in a single scanning of the main scan line. In this manner, the bitmap image data is output to the printing unit 107 by switching the line of image data to be output to the printing unit 107 in accordance with the skew of the main scan line. The printing unit 107 has a photosensitive drum as an image carrier, a charging unit for charging the photosensitive drum to a uniform charge, and an exposure unit that forms an electrostatic latent image on the photosensitive drum by exposing the photosensitive drum with light that is irradiated onto the charged photosensitive drum in accordance with bitmap image data. The printing unit 107 has a developing unit for developing the electrostatic latent image that is formed on the photosensitive drum with toner, and a transfer unit for transferring a toner image that has been developed on the photosensitive drum by the developing unit onto a sheet (recording paper). The printing unit further includes a fixing unit that heat-fixes to the sheet the toner image that has been transferred onto the sheet by the transfer unit. As a result, even when a skew occurs at the time of exposure and scanning, the electrostatic latent image generated on the image carrier is an image without a skew.

FIG. 5 is a view that shows an enlarged portion of a scan line in which a skew has arisen that causes a registration error. Reference numeral 500 denotes a state in which bitmap image data is delivered to the printing unit 107 while switching the line of image data in accordance with the skew of the scan line. However, as illustrated by the state denoted by reference numeral 500, when the line of image data is simply switched to send the bitmap image data to the printing unit 107, an unnatural step appears at the switching portion. Therefore, in order to eliminate this kind of unnatural step and achieve a smooth image, as illustrated in the state denoted by reference numeral 501, it is necessary to blend the two lines before and after the switching portion. Thereby, as illustrated in the state denoted by reference numeral 502, the steps at the scan line portions where a skew occurs are difficult to see.

Figure 6:
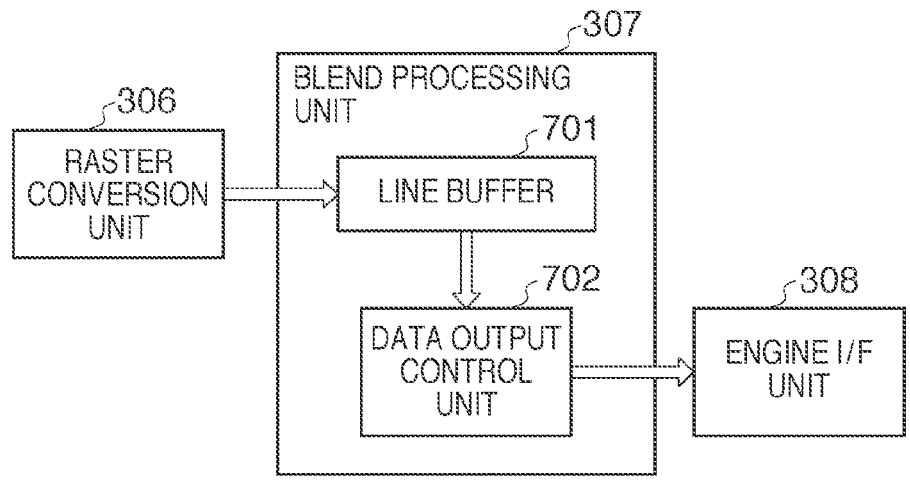
FIG. 6 is a block diagram that illustrates an exemplary detailed configuration of a blend processing unit according to the embodiment of the present invention.

Next, an exemplary detailed configuration of the blend processing unit 307 is illustrated using FIG. 6. FIG. 6 is a block diagram that illustrates an exemplary detailed configuration of the blend processing unit 307 according to this embodiment of the present invention.

Tile image data that has been converted into bitmap image data at the raster conversion unit 306 is stored at a specified address of a line buffer 701 included in the blend processing unit 307. The bitmap image data stored in the line buffer 701 is sent to a data output control unit 702 in accordance with the skew. Thereafter, the data output control unit 702 subjects the bitmap image data to blend processing, and outputs the resulting data to the engine I/F unit 308.

The DMA controller 305 according to the present embodiment generates readout addresses of tile image data so as to switch the readout line of the line buffer in accordance with the skew of the scan line. At this time, the data of the other lines that come before and after the line switching portion is also necessary for the blend processing. Therefore, tile image data that includes black portions and shaded portions as denoted by reference numeral 502 in FIG. 5 is stored in the line buffer 701 of the blend processing unit 307. It is thereby possible to perform blend processing on the tile image data also, and deliver bitmap image data of a line that is in accordance with the skew of the scan line to the printing unit 107. This is described in detail hereunder.

Figure 7:
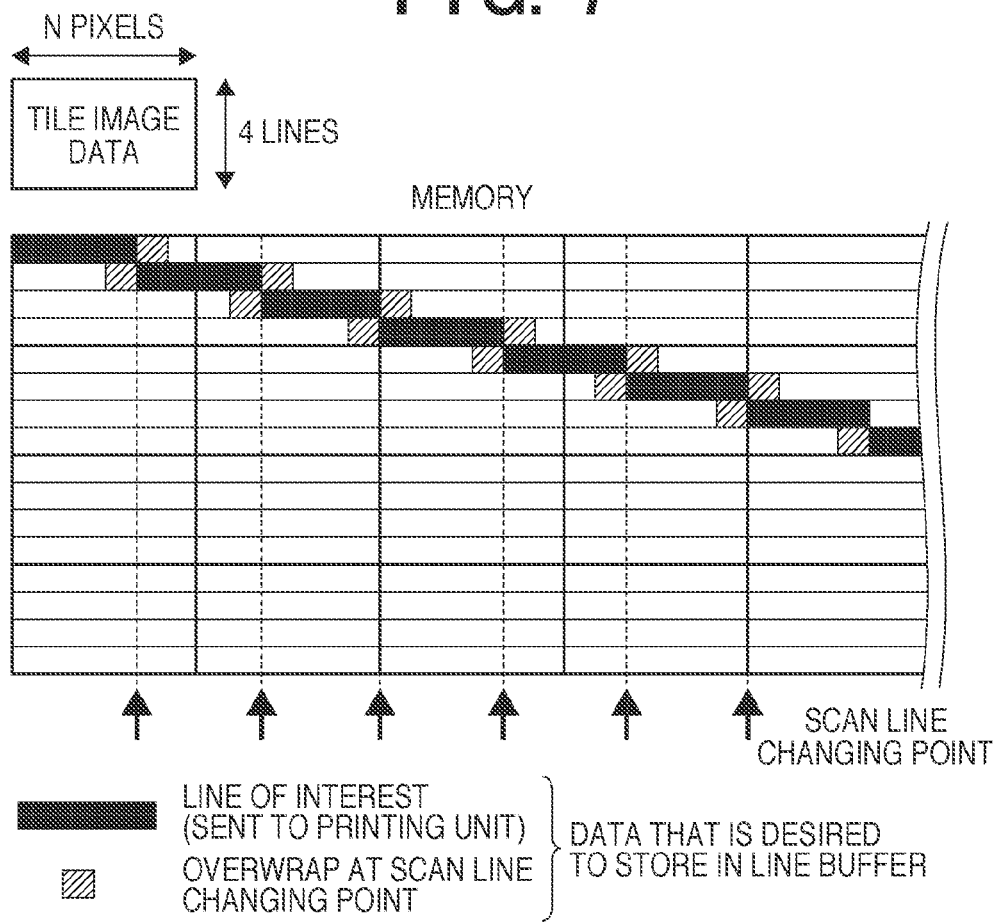
FIG. 7 is a view that illustrates the relation between tile image data and data of a line buffer.

FIG. 7 is a view that illustrates the relation between tile image data and data of the line buffer according to this embodiment of the present invention. According to the present embodiment, a case is assumed in which skewing of a scan line (interval between scan-line changing points) is comparatively large with respect to the tile size (in this case, N pixels×4 lines). In FIG. 7, the black portions represent image data that is sent to the printing unit 107 during a single scan, and the shaded portions represent overwrapping portions when switching lines (scan-line changing points). It is necessary to store the tile image data so that the above data is included in the line buffer 701. According to this embodiment, it is assumed that the line buffer 701 stores image data that has a height in the sub-scanning direction equivalent to an integral multiple (predetermined number) of the block amount (in this case, two blocks) of image data obtained with a single main scan.

Figure 8:
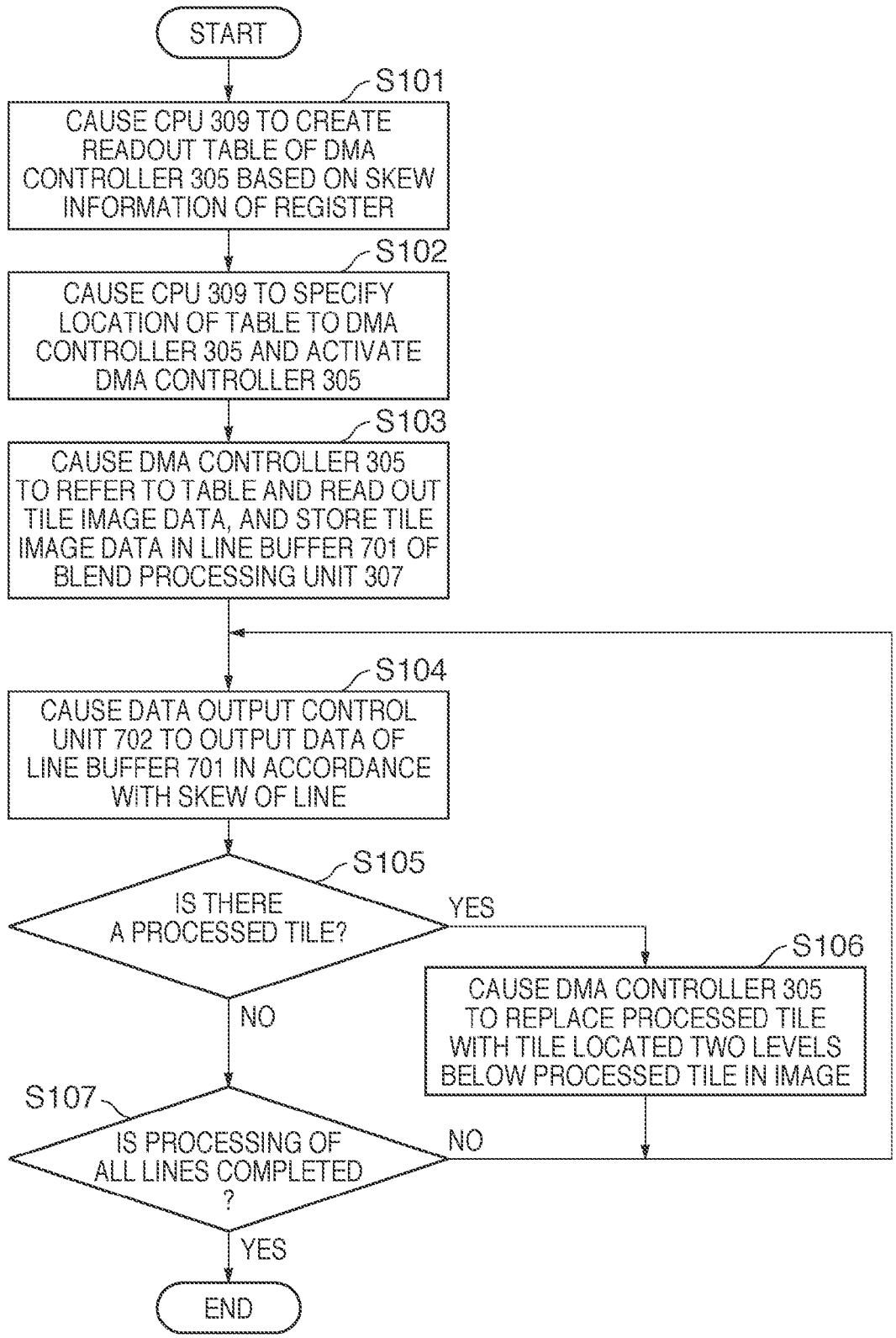
FIG. 8 is an exemplary flowchart that illustrates registration-correction processing according to the embodiment.

FIG. 8 is a flowchart that illustrates registration-correction processing according to the present embodiment. The CPU 309 executes a program stored in the ROM 310 to carry out this processing.

First, in S101, the CPU 309 creates a readout table of tile image data of the DMA controller 305 based on skew information of the register. The readout table is stored in the image memory 304 or the RAM 311. Hereunder, a case in which the readout table is stored in the RAM 311 is described. Next, the processing advances to S102 in which the CPU 309 specifies the location of the readout table in the RAM 311 to the DMA controller 305, activating the DMA controller 305. As a result, readout of image data from the image memory 304 or the RAM 311 by the DMA is started. Accordingly, the processing of S103 is executed by the DMA controller 305. In S103, the DMA controller 305 refers to the readout table, and reads out image data of the tile for which image data of the scan line that is the scanning target exists from the image memory 304. The DMA controller 305 sequentially stores the tile image data that is read out in the line buffer 701 of the blend processing unit 307. Thus, image data for eight lines (when one line includes (N×M) pixel data; corresponds to 2×M tiles) from the top of the image is stored in the line buffer 701. Next, the processing advances to S104. In S104, the data output control unit 702 outputs the image data of the line buffer 701 while adjusting the position of the image data in the sub-scanning direction in accordance with skew information of the line. Next, in S105, the DMA controller 305 determines whether a tile that includes only processed image data that will not be referred to again exist in the line buffer 701 with respect to the image data for the current page. If it is determined that a processed tile (processed block) exists, ("Yes" in S105), the processing advances to S106. In S106, based on the readout table in the RAM 311, the DMA controller 305 replaces the processed tile with a tile located two levels below the processed tile in the image. However, in this case, if the tile located two levels below the processed tile is outside the image, updating of that tile is not performed. Upon the data of the line buffer 701 being updated in this manner, the processing advances to S107. In S107, it is determined whether processing of all lines of image data has been completed. If the processing of all lines of image data has not been completed ("No" in S107), the processing returns to S104 to execute the above-described processing. The processing in S103, S104, and S106 in FIG. 8 is illustrated in detail below.

FIG. 9 is a view that illustrates tile image data and skew information of a scan line according to this embodiment of the present invention. In this case, the image memory stores image data in block units obtained by dividing image data into a plurality of blocks (tiles).

Reference numeral 900 denotes bitmap image data for a single page. The starting readout address of the image data is represented by "RegStartAddr", which shows the address of the left upper part of the image. The image data is readout two tiles at a time in the main scanning direction from the tile at the left upper part of the image and sequentially stored in the line buffer. The two tiles that are read out are adjacent upper and lower tiles. A tile for which processing is completed at the line buffer is replaced with a tile that is two levels below the processed tile. As shown in the figure, image data of a single page is divided into a plurality of tiles. Here, the size of a tile is specified with "RegTileXsize" (size in the x direction) and "RegTileYsize" (size in the y direction). Further, the number of tiles in the x direction of an image of one page when image data of a single page is divided into a plurality of tiles is specified with "RegTileXNum", and the number of tiles in the y direction is specified with "RegTileYNum". Information showing the skew of a scan line is specified using the interval between skew points ("RegAlignLength") and the overwrap length at a skew portion ("RegOverwrapLength"). Specification of the skew direction (moving direction) is made with "RegUpDownInfo". When this value ("RegUpDownInfo") is "00" it indicates that there is no skew, when the value is "10" it indicates that there is a skew of one line in the upward direction, and when the value is "11" it indicates that there is a skew of one line in the downward direction. Further, for a single scan line, the maximum movement line count in the upward direction with respect to the reference line is specified with "RegUpLines". Similarly, the maximum movement line count in the downward direction with respect to the reference line is specified with "RegDownLines". In this case, the reason "Reg" is attached to the start of each name is because these values are set in the register unit 501 of the DMA controller 305. In the example illustrated in FIG. 9, reference numeral 901 denotes the aforementioned reference line. In this case, the image data is stored in the image memory 304. Further, both the information relating to the tile image data and the information relating to the skew of the scan line are stored in the image memory 304 or the RAM 311.

Figure 10:
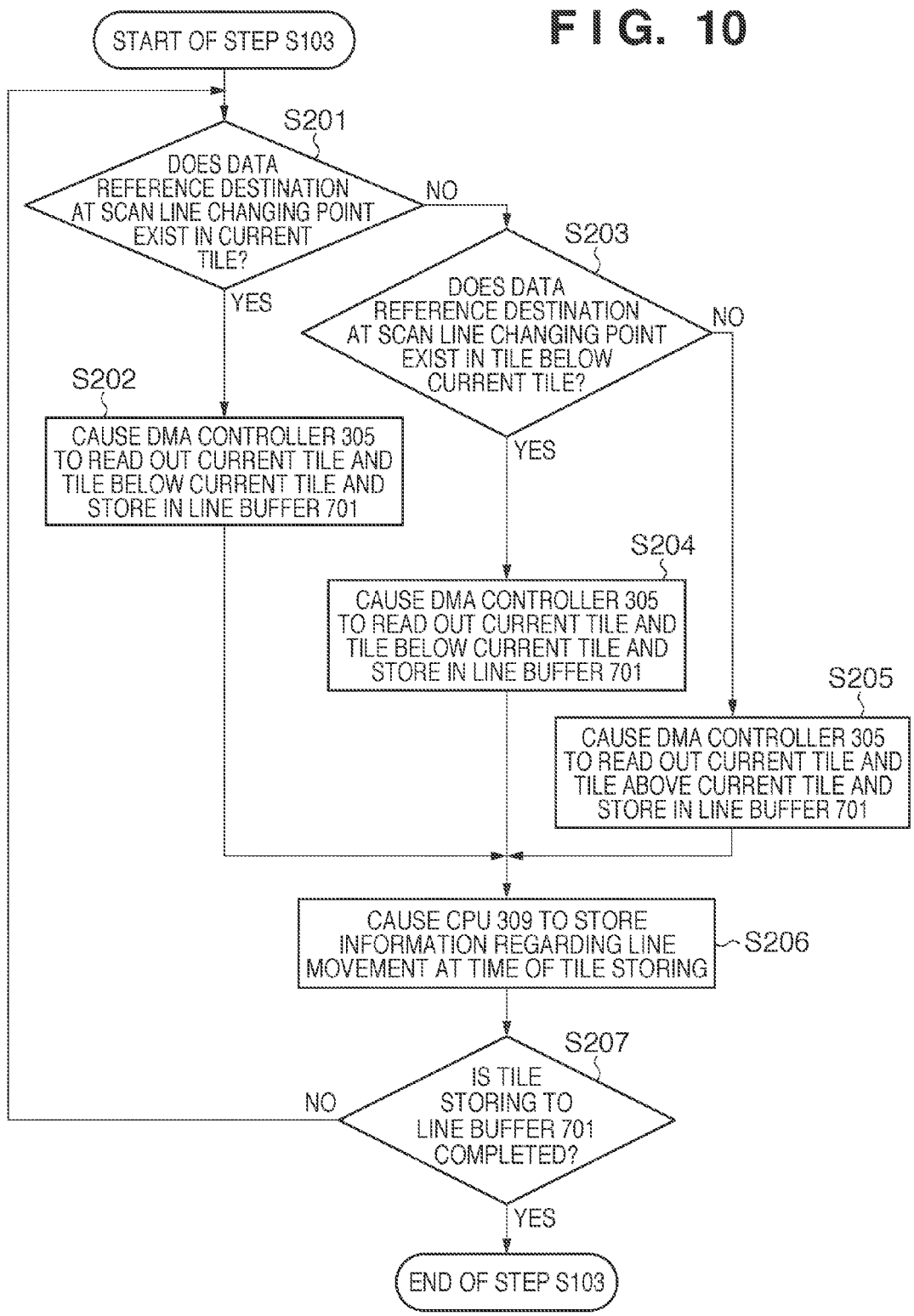
FIG. 10 is an exemplary flowchart that illustrates processing in S103 in FIG. 8.

FIG. 10 is an exemplary flowchart that illustrates processing in which the DMA controller 305 reads out tile image data and stores the tile image data in a line buffer according to this embodiment of the present invention. This flowchart illustrates in detail the processing in S103 in FIG. 8. In the above described S101, the CPU 309 sets the aforementioned numerical values in the readout table for tile image data of the DMA controller 305.

First, in S201, the DMA controller 305 determines whether a data reference destination at a scan-line changing point exists in a tile that includes the line of interest and for which readout is performed. If a data reference destination exists ("Yes" in S201), the processing advances to S202. If there is no destination for the data reference ("No" in S201), the processing advances to S203. In S202, the DMA controller 305 reads out two upper and lower tiles consisting of the tile including the current line of interest and the tile that is one level below the tile including the current line of interest from the image memory 304, and stores the data in the line buffer 701. Thereafter, the processing advances to S206. Further, in S203, the DMA controller 305 determines whether a data reference destination at a scan-line changing point exists in the tile that is one level below the tile that includes the line of interest and for which readout is performed. If a data reference destination exists in the lower tile ("Yes" in S203), the processing advances to S204. If there is no data reference destination in the lower tile, that is, if a data reference destination exists in the tile that is one level above the tile including the line of interest ("No" in S203), the processing advances to S205. In S204, the DMA controller 305 reads out two upper and lower tiles consisting of the tile including the current line of interest and the tile including a data reference destination that is one level below the tile including the current line of interest from the image memory 304, and stores the data in the line buffer 701. Thereafter, the processing advances to S206. Further, in S205, the DMA controller 305 reads out two upper and lower tiles consisting of the tile including the current line of interest and the tile including a data reference destination that is one level above the tile including the current line of interest from the image memory 304, and stores the data in the line buffer 701. Thereafter, the processing advances to S206. In S206, the CPU 309 stores, in the image memory 304 or the RAM 311, line-movement information for a single tile in the sub-scanning direction relating to when tile image data is stored in the line buffer 701. In S207, it is determined if storage of image data for, in the above example, (2×M) tiles to the line buffer 701 is completed. If storage of the image data is not completed ("No" in S207), the above-described steps are repeatedly executed until storage of the image data is completed.

FIGS. 11A, 11B, 12A, and 12B are views that illustrate the manner in which the DMA controller 305 reads out and stores tile image data according to the flowchart in FIG. 10.

Figure 11A:
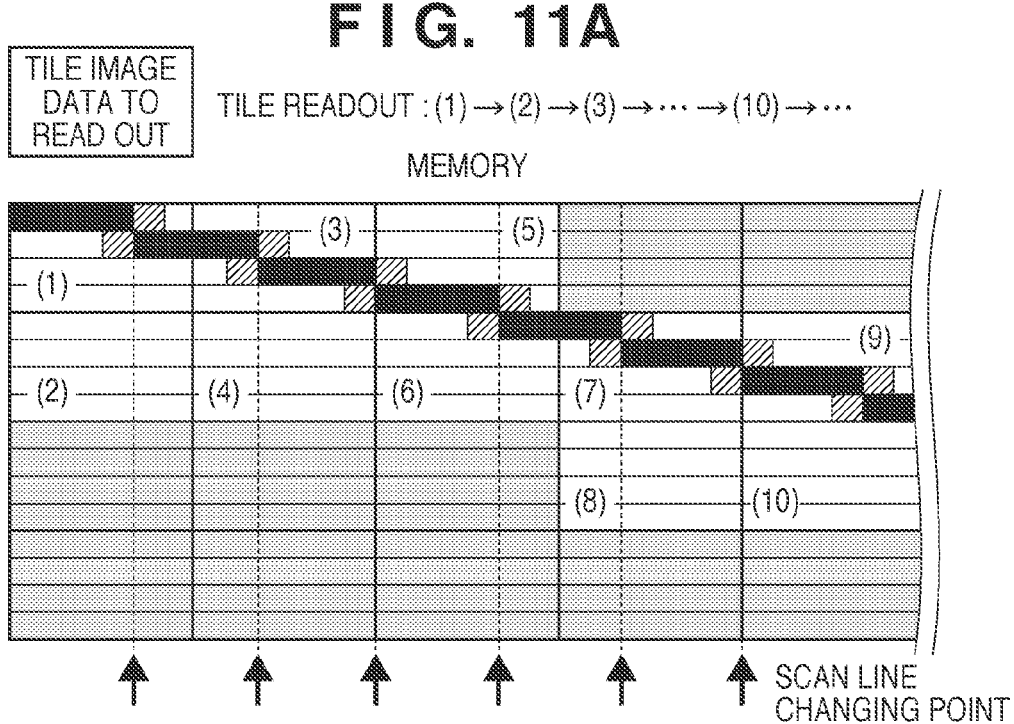
FIGS. 11A, 11B, 12A, and 12B are views that describe readout and storage of tile image data according to the embodiment.
Figure 11B:
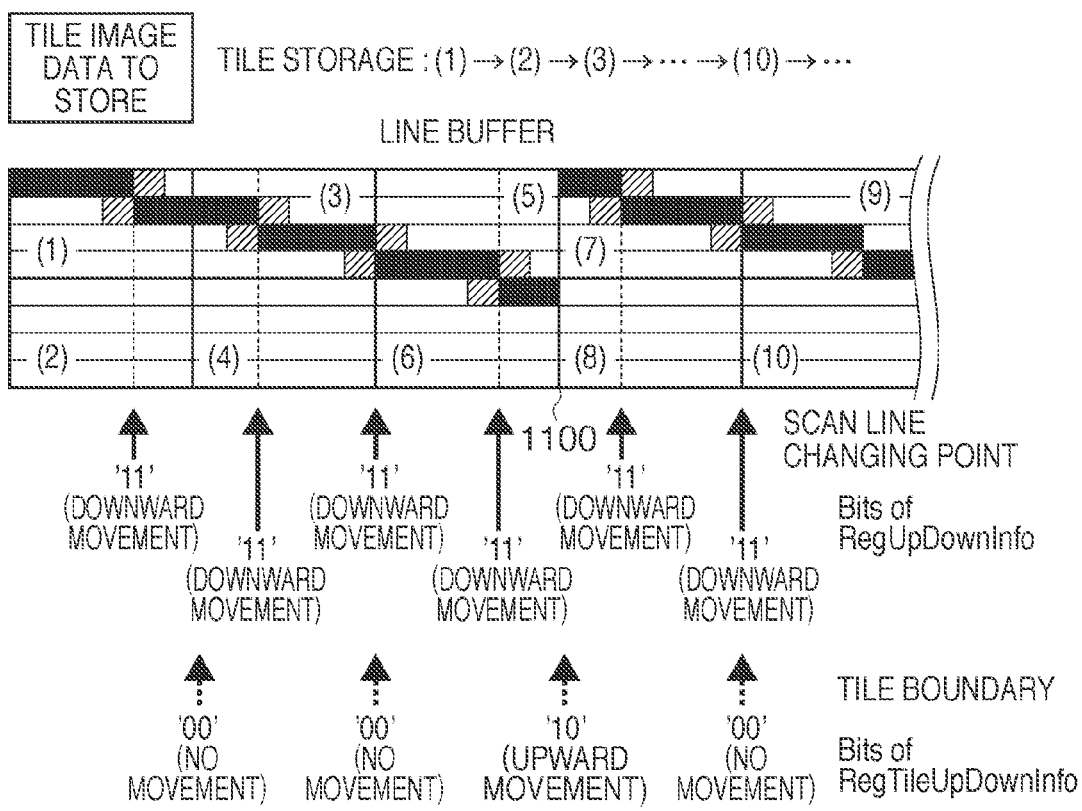

FIG. 11A illustrates a case in which a line of interest skews downward. Two upper and lower tiles of the tile image data are read out in sequential order in the main scanning direction of the image data, and stored in the line buffer 701. At this time, as shown in FIG. 11B, the line of interest and overwrap data are stored without omission in the line buffer 701. When storing the relevant data in the line buffer 701, as illustrated by the state denoted by reference numeral 1100 in FIG. 11B, in some cases the target scan line may move by the amount of one tile in the sub-scanning direction. The movement information at the time of this tile storing is stored in the image memory 304 or the RAM 311 as line-movement information ("RegTileUpDownInfo") at a tile boundary as shown in FIG. 11B, together with positional information (a block position) that shows the tile position. According to the state denoted by reference numeral 1100, line-movement information "10" (upward movement) is stored that indicates that information of tiles denoted by reference numerals (7) and (8) has been moved in the upward direction by the amount of a single tile and stored in the line buffer 701.

Figure 12A:
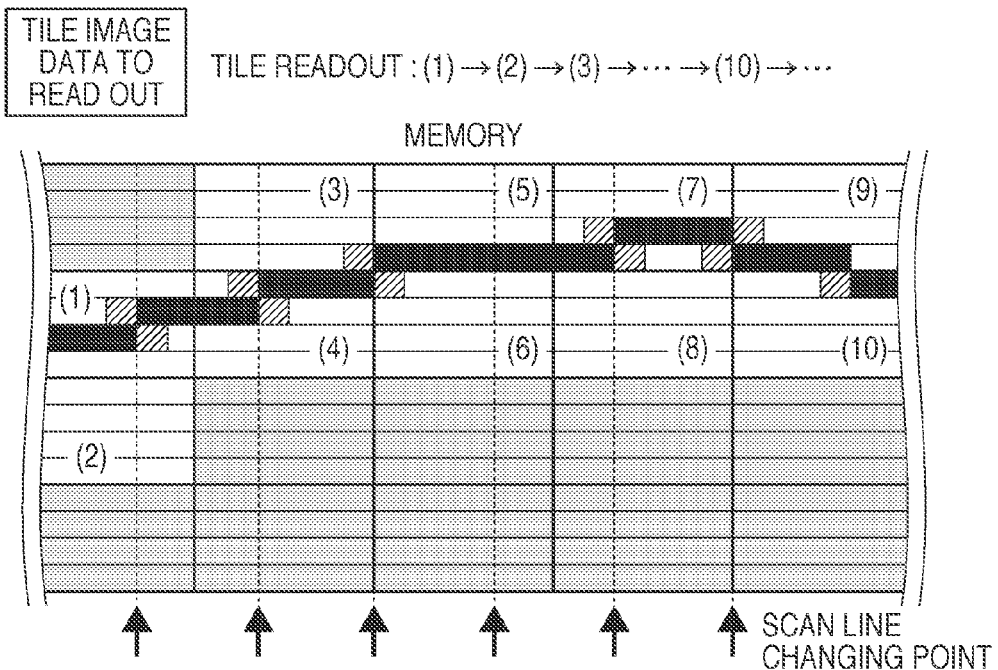
Figure 12B:
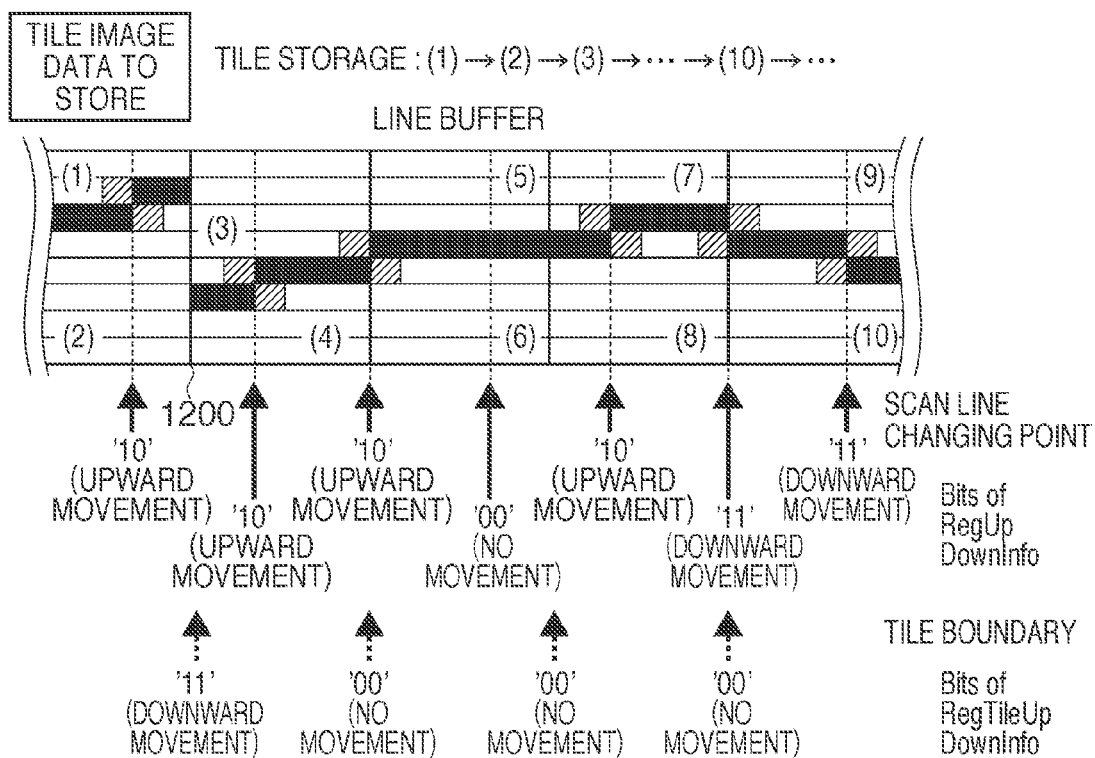

FIGS. 12A and 12B are views that illustrate a case in which a line of interest skews upward. According to FIG. 12A, two upper and lower tiles are read out in sequential order in the main scanning direction, and tile image data read out in this manner is stored in the line buffer 701 as shown in FIG. 12B. Further, line-movement information at a tile boundary is also stored in the image memory 304 or the RAM 311.

According to the state denoted by reference numeral 1200 in FIG. 12B, line-movement information "11" (downward movement) is stored that indicates that information of tiles (3) and (4) that are read out following tiles (1) and (2) is moved in the downward direction by the amount of a single tile and stored in the line buffer 701.

Figure 13:
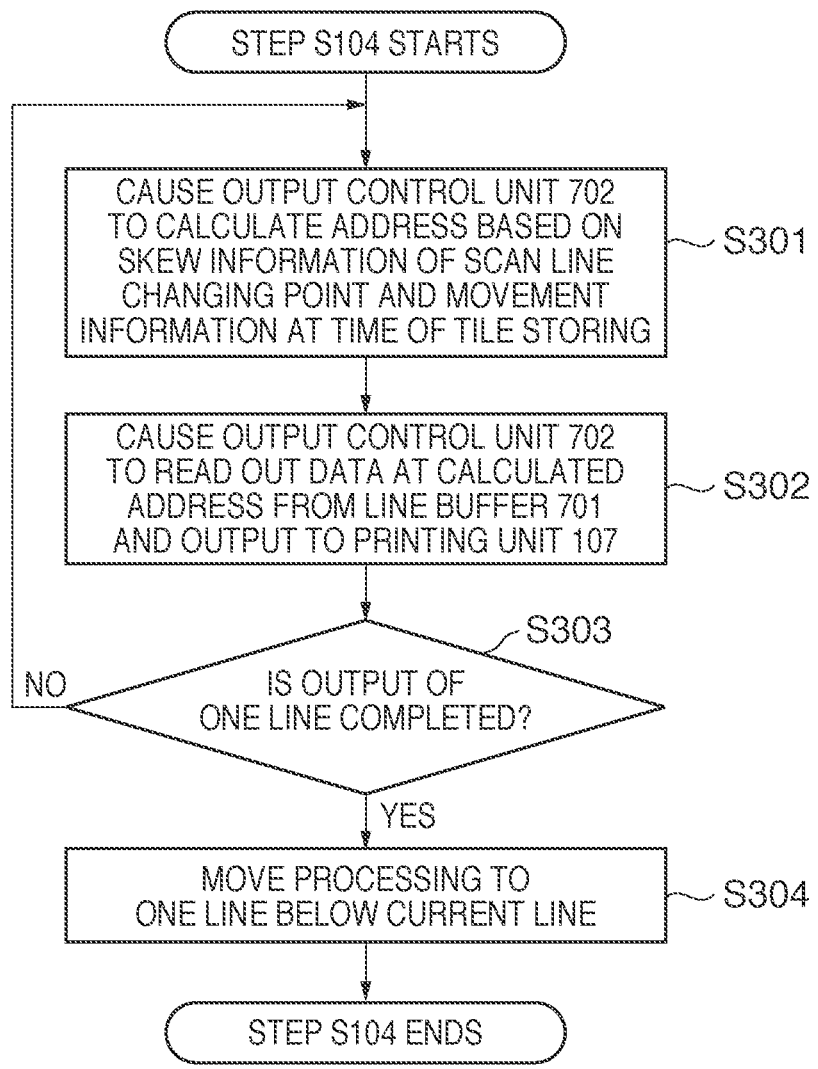
FIG. 13 is an exemplary flowchart that illustrates processing in S104 in FIG. 8.

FIG. 13 is an exemplary flowchart that illustrates a method of outputting bitmap image data of the data output control unit 702 of the blend processing unit 307 in S104 in FIG. 8.

First, in S301, the data output control unit 702 calculates a readout address of bitmap image data of the line buffer 701 based on stored information regarding a scan-line changing point and information regarding a tile boundary at a time of tile storing. In this case, when it is detected that a movement at a tile boundary is "upward information" as shown in FIG. 11B, the address is calculated so that the tile storing the line of interest is a tile that is positioned on the upper side of the line buffer. In contrast, as shown in FIG. 12B, when a movement at a tile boundary is "downward information", the address is calculated so that the tile storing the line of interest is a tile that is positioned on the lower side of the line buffer. Next, the processing advances to S302 in which the data output control unit 702 reads out the bitmap image data stored in the address calculated in S301 from the line buffer 701. The data read out in this manner is subjected to blend processing, and thereafter is output to the printing unit 107. Next, the processing advances to S303 in which the data output control unit 702 determines whether or not the output of image data for a single scan line from the line buffer 701 is completed. If the output of image data for a single scan line has not been completed ("No" in S303), the processing returns to S301. In contrast, if the output control unit 702 determines that the output of image data for a single scan line has been completed ("Yes" in S303), the processing advances to S304. In S304, the processing shifts to processing of image data of the next line that is one line below the single scan line that has been output.

Figure 14:
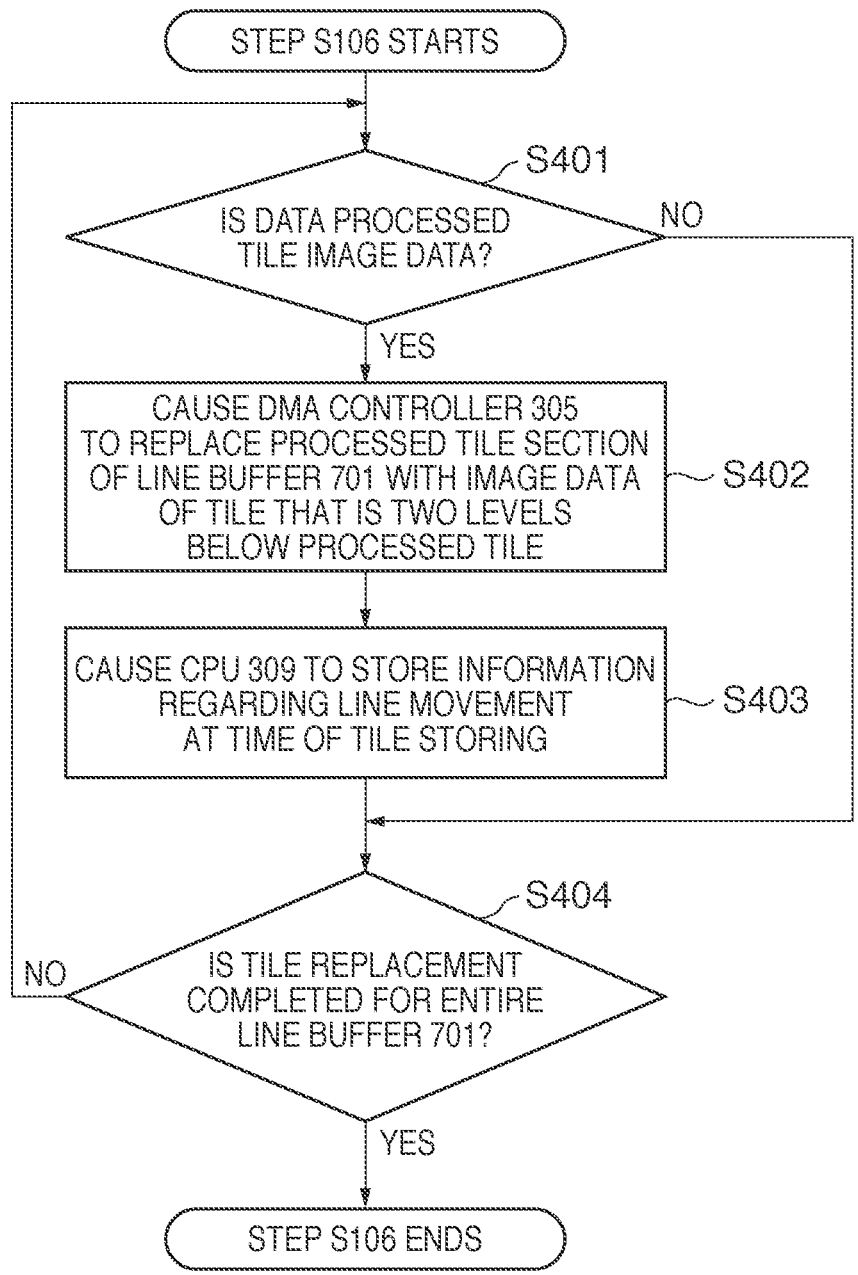
FIG. 14 is an exemplary flowchart that illustrates processing in S106 in FIG. 8.

FIG. 14 is an exemplary flowchart that illustrates a method of replacing a processed tile of the line buffer 701 of the DMA controller 305 according to the present embodiment. This processing describes in detail the operations in S106 in FIG. 8.

First, in S401, the DMA controller 305 determines whether or not the tile image data stored in the line buffer 701 is data for a processed tile for which reading out of lines has ended. More specifically, the DMA controller 305 determines whether or not the tile is a processed tile that includes all output image data and which will not be a target of processing again. If the tile is a processed tile ("Yes" in S401), the processing advances to S402. If the tile is not a processed tile ("No" in S401), the processing advances to S404. In S402, the DMA controller 305 replaces the section of the processed tile of the line buffer 701 with tile image data that is read out from a tile two levels below the processed tile in the image memory 304. However, in S402, if the tile that is two levels below the processed tile is outside the image, reading out of the tile is not performed further, and all image data of the tile is set (reset) to "0". Next, the processing advances to S403, in which the CPU 309 stores, in the image memory 304 or the RAM 311, information regarding movement of a line that occurs when tile image data is newly stored in the line buffer 701, and updates the skew information. Subsequently, in S404, the DMA controller 305 checks whether replacing of the entire tile image data of the line buffer 701 has been completed. If the replacing has not been completed ("No" in S404), the processing returns to S401. When replacing of the entire tile image data of the line buffer 701 has been completed ("Yes" in S404), this processing ends.

Figure 15A:
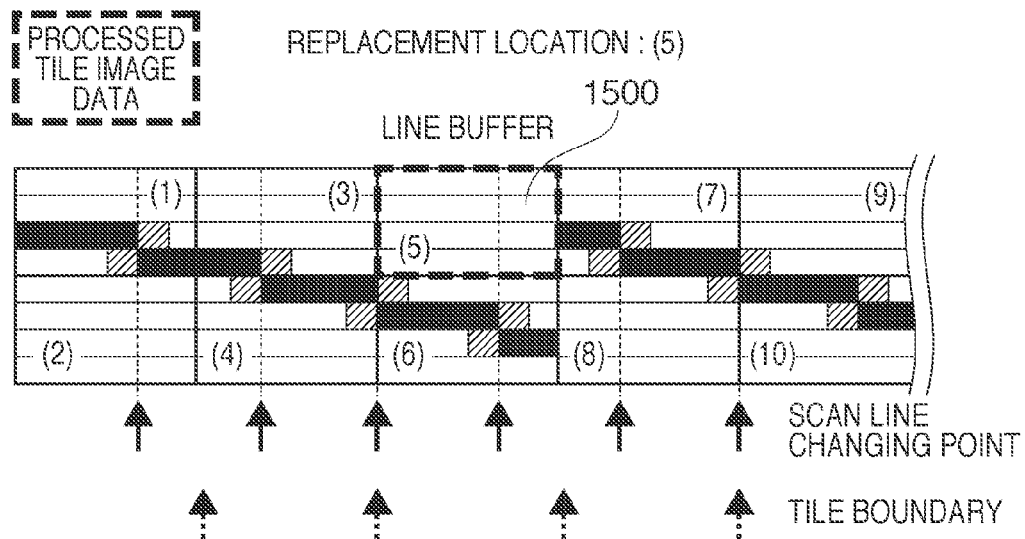
FIGS. 15A and 15B are views that illustrate an example of replacing tile image data according to the embodiment.
Figure 15B:
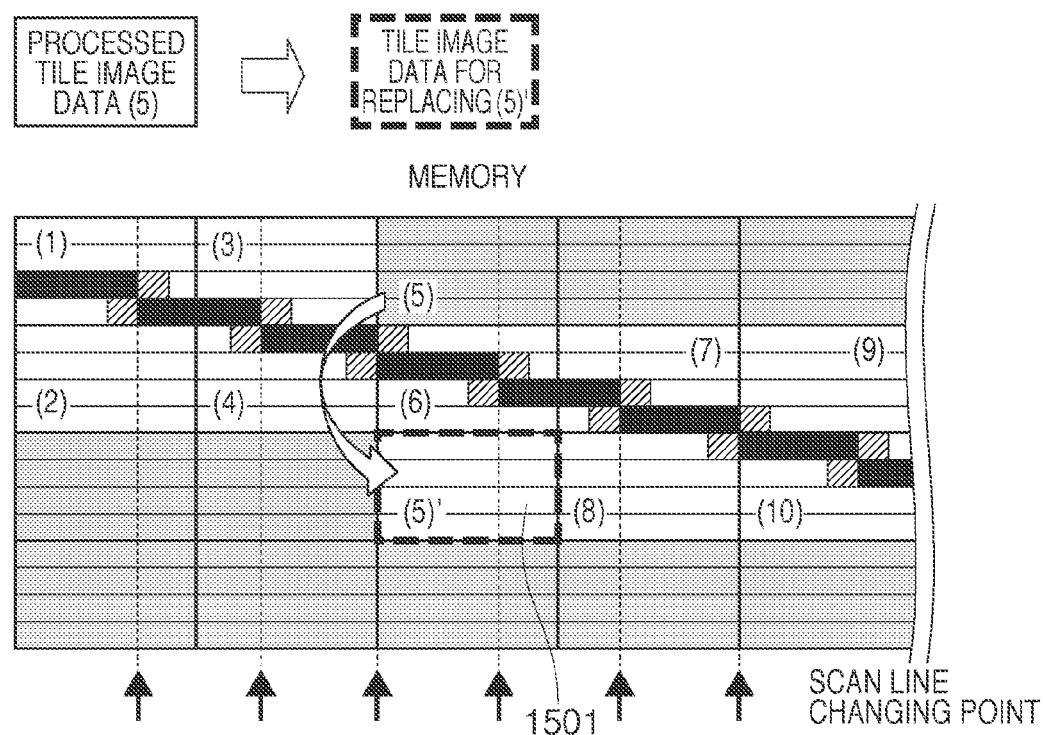

FIGS. 15A and 15B are views that illustrate the manner in which the DMA controller 305 replaces processed tile image data of the line buffer 701 according to the flowchart in FIG. 14.

FIG. 15A illustrates an example of tile image data corresponding to an nth line of interest that is stored in the line buffer 701. As shown in FIG. 15A, as processing advances and the line of interest moves downward, image data of a processed tile 1500 that does not include the line of interest, that is, that will not be referred to again, arises in the line buffer 701. Since further processing of the image data of the tile 1500 is unnecessary, as shown in FIG. 15B, the image data of the tile 1500 is replaced in the image memory 304 with stored image data of a tile 1501 that is located at a position that is below the tile 1500 by the amount of two tiles. It is thereby possible to maintain a state in which the line of interest and the overwrap data are continuously stored in the line buffer 701 while continuing processing.

Although in the above-described example the data transfer method relating to the present embodiment is implemented with a DMA controller, if the CPU 309 has surplus processing time the data transfer method can be implemented by the CPU 309. It is also possible to implement a data transfer method using a second CPU other than the CPU 309 or a DSP (digital signal processor).

With regard to reading out tile image data by the DMA controller 305, although an example is mentioned above in which the reading out of the tile image data is executed based on a table created by the CPU 309, the reading out of the tile image data can similarly be executed with an internal circuit of the DMA controller 305. In that case, it is necessary to calculate readout addresses during processing instead of using a readout table for the tile image data. In addition, with regard to the data output control unit 702, similarly to the DMA controller 305, output control of bitmap image data can also be performed by creating a table that incorporates both skew information of the scan line and movement information at a tile boundary.

Further, in the case of a color image forming apparatus including developing units that correspond to each of a plurality of colors (CYMK), color shifting caused by registration errors for each individual color can be prevented by implementing the data transfer method according to the present embodiment for each individual color.

According to the present embodiment as described above, image data is stored in a line buffer in a plurality of block units that are obtained by dividing an image. It is thereby possible to prevent deterioration of an image at a skew portion in a scan line due to blend processing. Further, image data of tiles of a fixed amount can be transferred to a line buffer and processed while changing a tile (block) of an image that is the readout target in accordance with output of the line of interest. Consequently, it is possible to decrease the capacity of the line buffer to the required minimum.

Figure 16:
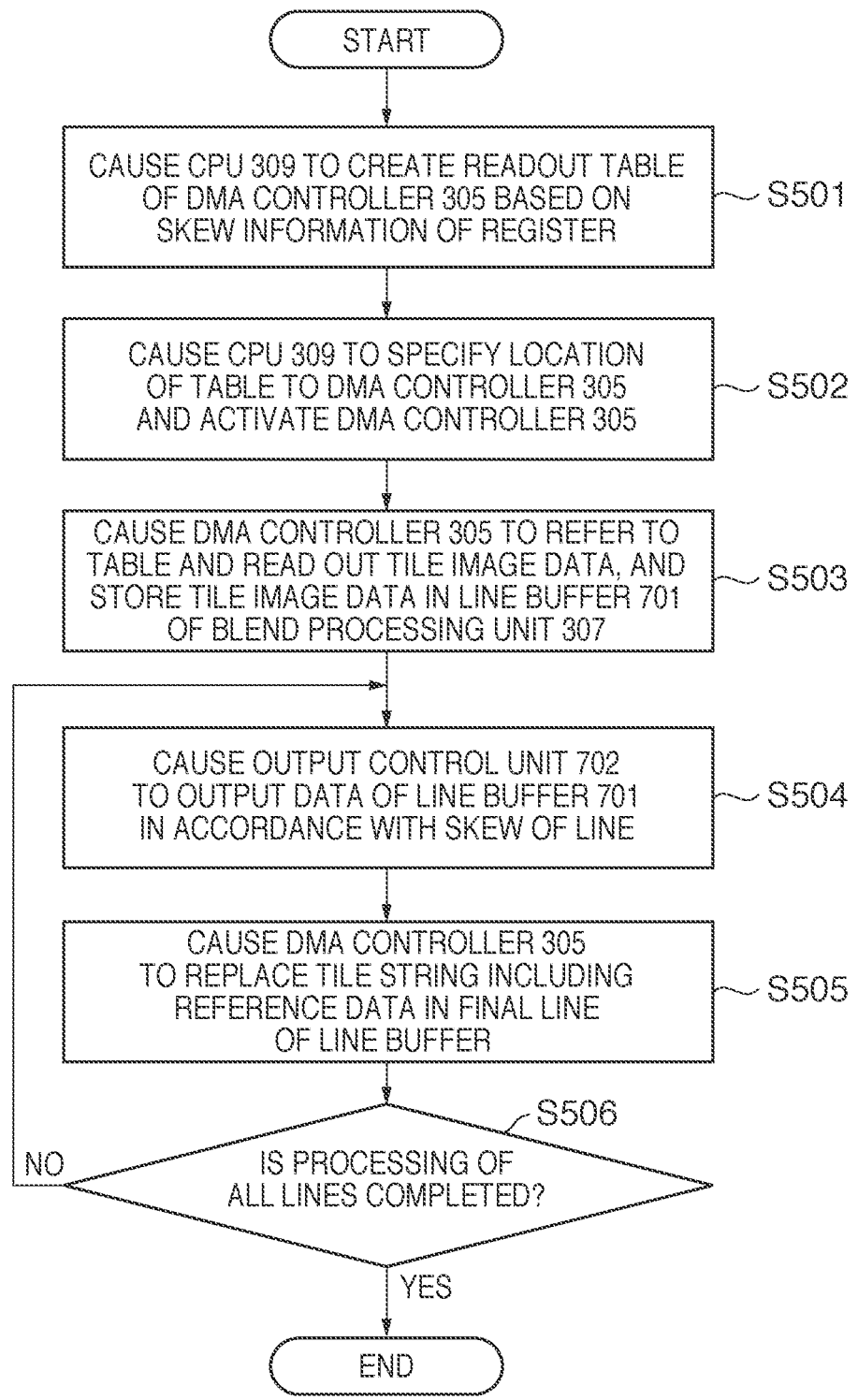
FIG. 16 is an exemplary flowchart that illustrates registration-correction processing according to another embodiment.

FIG. 16 shows an exemplary flowchart of registration correction according to another embodiment of the present invention. According to this embodiment, it is assumed that the height of the line buffer 701 is increased by the amount of one line per tile (in the preceding example the height of a tile is five lines), and thus the line buffer 701 can be decreased more than in the foregoing embodiment. The differences between the flowchart shown in FIG. 16 and the foregoing embodiment are the method of storing tile image data to the line buffer 701 (S103) and the replacement method (S106). The configuration of the image forming apparatus according to the present embodiment is the same as that of the foregoing embodiment, and hence a description thereof is omitted here.

FIG. 16 is an exemplary flowchart that illustrates registration-correction processing according to the present embodiment. The CPU 309 performs this processing by executing a program stored in the ROM 311. In FIG. 16, the processing of S501 to S504 is the same as the processing of S101 to S104 in FIG. 10, respectively. However, in S503, the DMA controller 305 refers to the readout table, reads out tile image data from the image memory 304, and stores the tile image data that is read out in the line buffer 701 of the blend processing unit 307 in sequential order. At this time, image data of an amount for one tile and one line is stored in the line buffer 701. When the tile image data is stored in the entire line buffer 701, the processing advances to S504.

In S505, based on a tile-image-data readout table stored in the image memory 304 or the RAM 311, the DMA controller 305 replaces a string including reference data in the final line on the line buffer 701 with the next image data.

Figure 17:
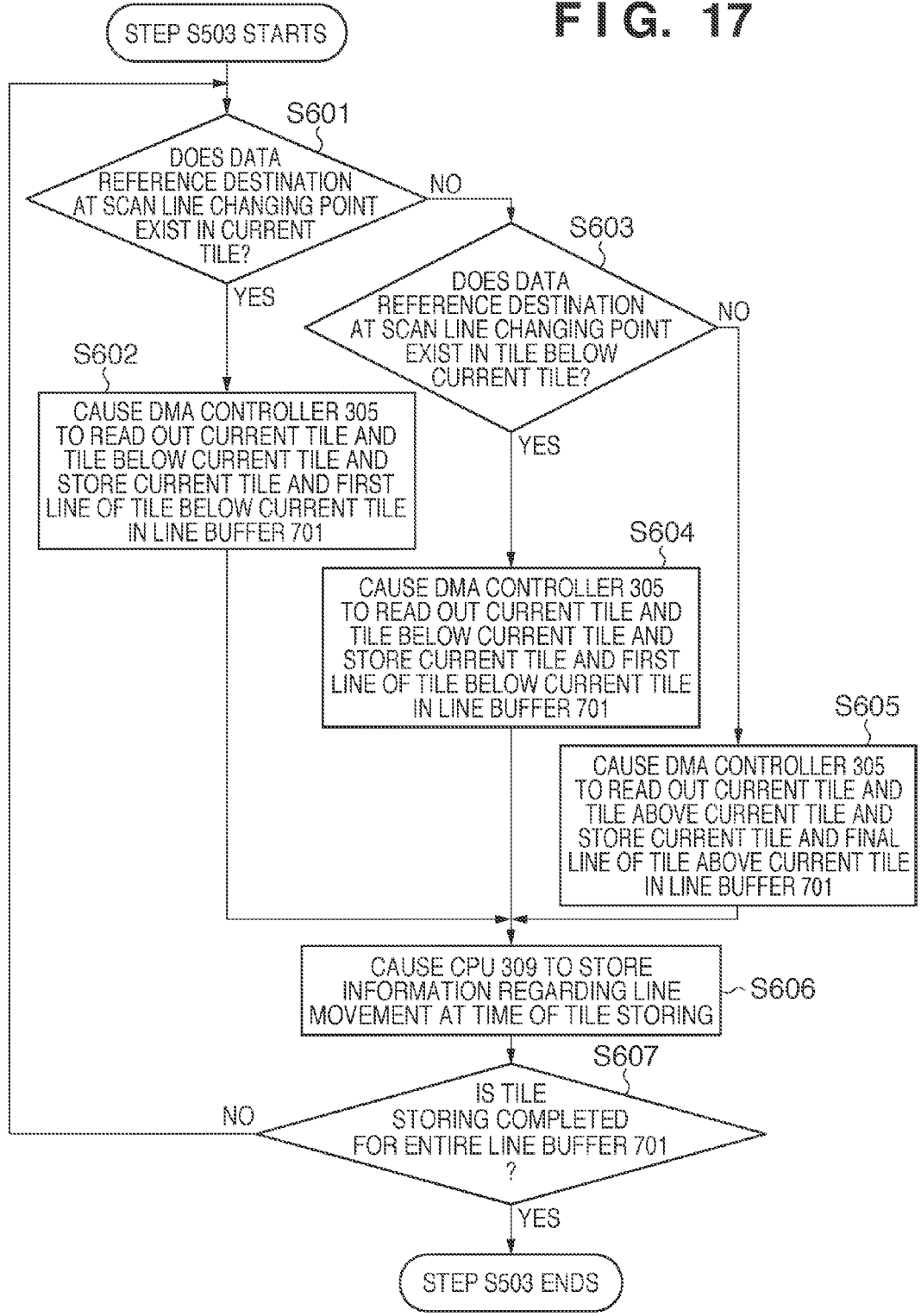
FIG. 17 is an exemplary flowchart that illustrates processing in S503 in FIG. 16.
Figure 18A:
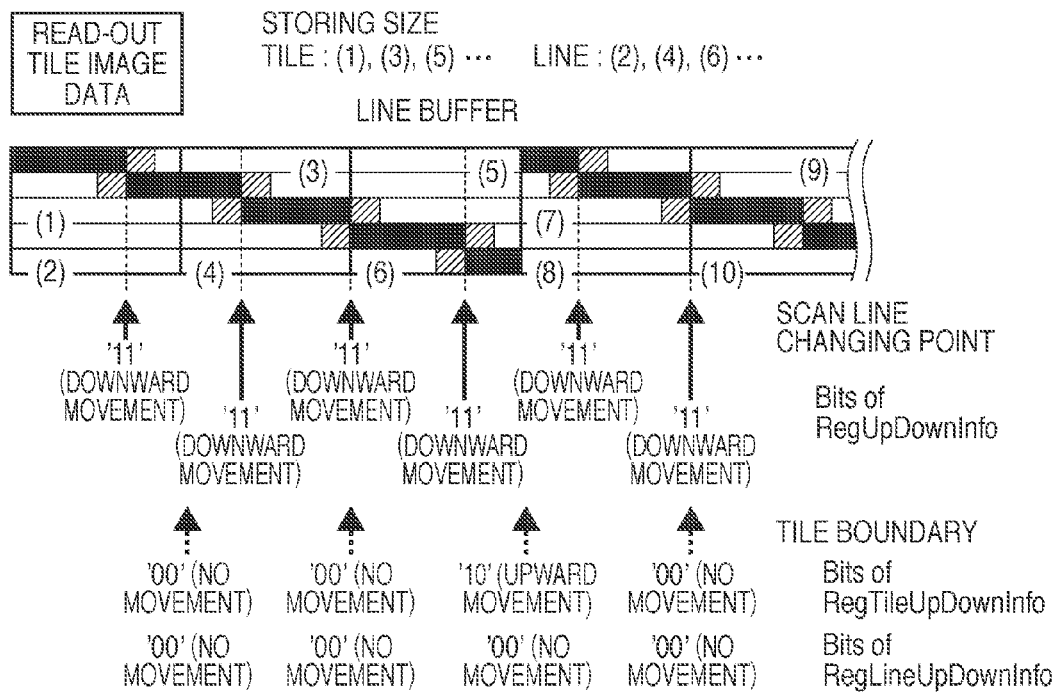
FIGS. 18A and 18B are views that illustrate an example of readout and storage of tile image data according to another embodiment.
Figure 18B:
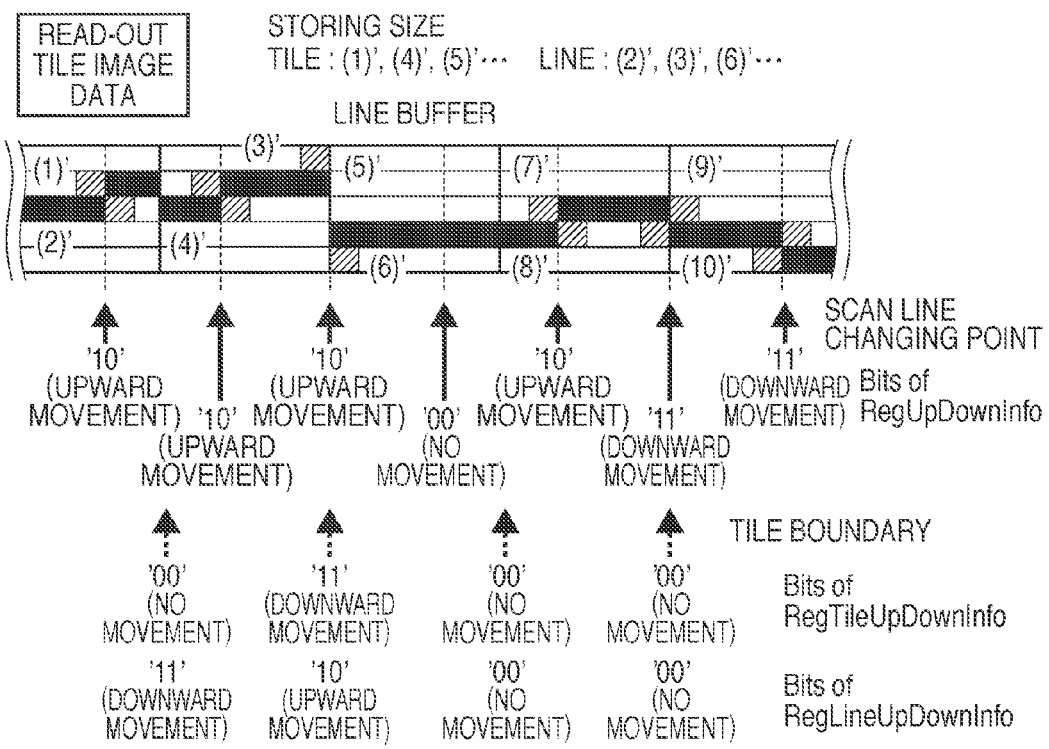

A tile-image-data readout method and a method of storing data to the line buffer of the DMA controller 305 according to the present embodiment will now be illustrated referring to FIGS. 17, 18A, and 18B.

FIG. 17 is an exemplary flowchart that illustrates in detail the processing in S503 in FIG. 16.

First, in S601, the DMA controller 305 determines whether a data reference destination at a scan-line changing point exists in a tile that includes the line of interest and for which readout is performed. If a data reference destination exists ("Yes" in S601), the processing advances to S602. In S602, the DMA controller 305 reads out two tiles consisting of the tile including the current line of interest and an adjacent tile that is one level below the tile including the current line of interest from the image memory 304. At this time, the DMA controller 305 stores image data for the entire tile that includes the line of interest and image data of the uppermost one line of the tile that is one level below the aforementioned tile in the line buffer 701. Thereafter, the processing advances to S606.

In contrast, if no data reference destination exists in the tile ("No" in S601), the processing advances to S603. In S603, the DMA controller 305 determines whether or not a data reference destination exists at a scan-line changing point in the tile that is one level below the tile including the line of interest for which readout is to be performed. If the DMA controller 305 determines that there is a data reference destination in the tile one level below the aforementioned tile ("Yes" in S603), the processing advances to S604. In S604, the DMA controller 305 reads out the tile that includes the current line of interest and the tile that is one level below the aforementioned tile from the image memory 304. At this time, the DMA controller 305 stores image data for the entire tile that includes the line of interest and image data of the uppermost one line of the tile that is one level below the aforementioned tile in the line buffer 701. Thereafter, the processing advances to S606. If there is no data reference destination in the tile that is one level below the tile including the line of interest, that is, when the data reference destination is in a tile that is one level above the tile that includes the current line of interest ("No" in S603), the processing advances to S605. In S605, the DMA controller 305 reads out the tile that includes the current line of interest and the tile that is one level above the aforementioned tile from the image memory 304. At this time, the DMA controller 305 stores image data for the entire tile that includes the line of interest and image data of the final line of the tile that is one level above the aforementioned tile in the line buffer 701. Thereafter, the processing advances to S606. In S606, the CPU 309 stores, in the image memory 304 or the RAM 311, line-movement information for one tile or one line in the sub-scanning direction that relates to the time the tile image data is stored in the line buffer 701. Subsequently, in S607, it is determined whether storing of tile image data to the entire line buffer 701 is completed. If storing is not completed, the above steps are repeated until storing of tile image data to the entire line buffer 701 is completed.

FIGS. 18A and 18B are views that illustrate an example in which the DMA controller 305 reads out tile image data from the image memory 304, and the data is stored in the line buffer 701 of the blend processing unit according to the flowchart of FIG. 17. FIG. 18A corresponds to the above described FIG. 11A, and FIG. 18B corresponds to FIG. 12B.

When the line of interest skews downward, as shown in FIG. 11A, the tile image data of two upper and lower tiles is read out in sequential order in the scanning direction of the image data and stored in the line buffer 701. At this time, as shown in FIG. 18A, the line of interest and the overwrap data are stored in the line buffer 701. Similarly, when the line of interest skews upward, as shown in FIG. 18B, the tile image data that is read out in sequential order for two tiles at a time is stored in the line buffer 701. According to the present embodiment, when storing the tile image data to the line buffer 701, a line movement of the amount of one tile or one line may occur in the sub-scanning direction. Information regarding the movement when performing this tile storing is stored in the image memory 304 or the RAM 311 as line-movement information at a tile boundary as shown in FIGS. 18A and 18B, together with skew information of the line at a scan-line changing point. The data output control unit 702 controls output according to this information.

In FIG. 18B, the tiles (1)' and (2)' are stored with a positional relationship between the tiles that is the same as that of tiles (1) and (2) in FIG. 12B. For a tile (3)', it is sufficient to move the target line in the downward direction by only one line without moving the entire tile, and therefore the image data that is the processing target can be stored in the height (5 lines) in the lengthwise direction of the line buffer 701. Hence, the tile is not moved by the amount of one tile in the downward direction as shown in FIG. 12B. Instead the tile data that is the processing target is stored in the line buffer 701 by lowering the line used to refer to image data by only one line. Next, at the tile (5)', since it is necessary to move the tile by the amount of one tile in order to refer to the line of interest, a movement occurs in the downward direction at the tile boundary. As a result, by returning the line that moved in the downward direction by the amount of one line at the preceding time in the upward direction, it is possible to fit the data that is the processing target into the height of five lines. Thus, the data of the tile (5)' is stored in the line buffer 701 in the same manner as that of the tile (5) in FIG. 12B. Next, with respect to the tiles (7)' and (9)', the data that is the processing target fits into the five-line height of the line buffer 701 as it is without performing a movement at the tile boundary or in the upward or downward direction of the lines. In FIGS. 18A and 18B, the term "Bits of RegLineUpDownInfo" refers to a movement of one tile amount in the upward or downward direction at the tile boundary.

A method of replacing a processed tile in the line buffer 701 of the DMA controller 305 according to the present embodiment will now be described referring to FIGS. 19, 20A, and 20B.

Figure 19:
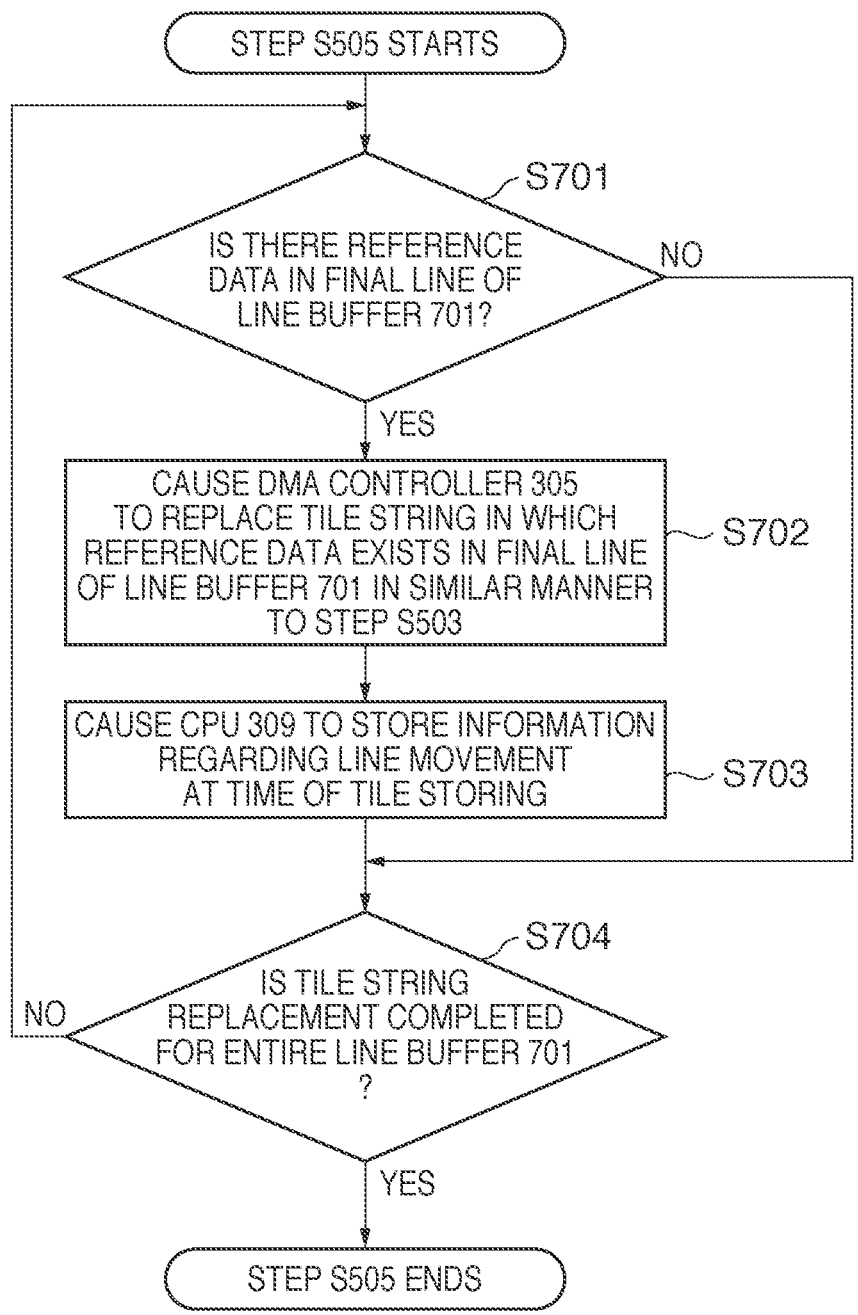
FIG. 19 is an exemplary flowchart that illustrates processing in S505 in FIG. 16.

FIG. 19 is an exemplary flowchart that illustrates registration-correction processing according to the present embodiment (S505 in FIG. 16).

In S701, the DMA controller 305 determines whether or not reference data exists in the final line of the tile image data string of the line buffer 701. If the DMA controller 305 determines the reference data exists ("Yes" in S701), the processing advances to S702. If not, ("No" in S701), the processing advances to S704. In S702, the DMA controller 305 replaces the tile image data string of the line buffer 701 using the same method as in S503 in FIG. 16. In this case also, if the target tile is outside the image, the data of that tile portion is set (reset) to "0". Subsequently, in S703, the CPU 309 stores information regarding a line movement that occurs when tile image data is newly stored to the line buffer 701 in the image memory 304 or the RAM 311 and updates the skew information. Next, the processing advances to S704 in which it is determined whether or not replacing of tile image data of the entire line buffer 701 is completed. If replacing of tile image data of the entire line buffer 701 is not completed ("No" in S704), the processing of the above steps is repeated until replacing of tile image data of the entire line buffer 701 is completed ("Yes" in S704).

Figure 20A:
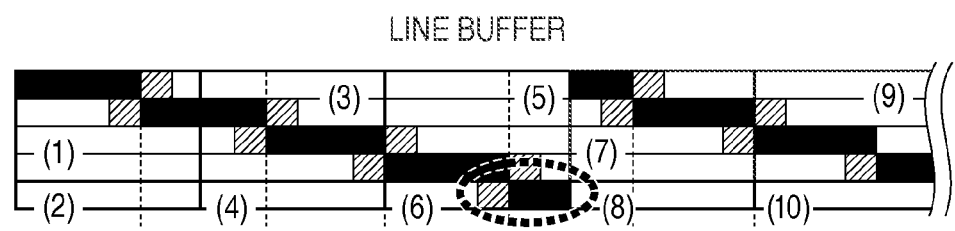
FIGS. 20A and 20B are views that illustrate an example of replacing tile image data according to another embodiment.
Figure 20B:
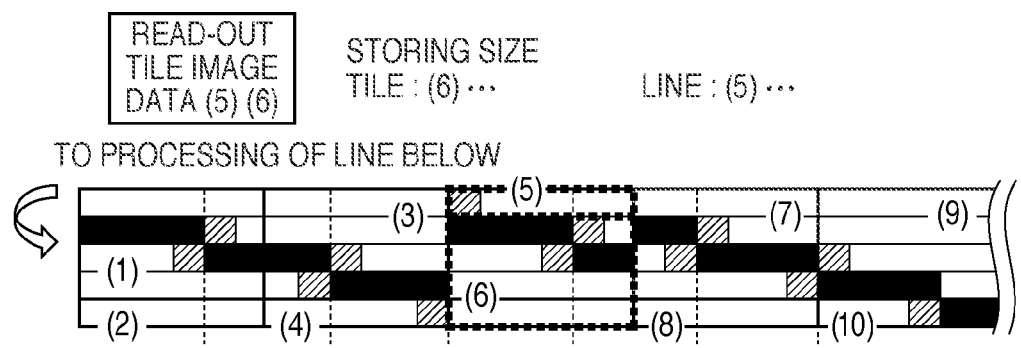

FIGS. 20A and 20B are views that illustrate an example in which the DMA controller 305 replaces a tile image data string of the line buffer 701 according to the flowchart in FIG. 19. FIG. 20A corresponds to the above described FIG. 18A.

In this case, it is assumed that there is tile image data that has reference data in the final line of the line buffer 701 during processing of the nth line of interest, as indicated by the section surrounded by a dotted line shown in FIG. 20A. When the processing of the data output control unit 702 moves to the (n+1)th line of interest that is one level below the nth line of interest, the reference data of this dotted-line section is no longer dependent on the line buffer 701. Therefore, in accordance with the flow of reading out and storing of tile image data illustrated in FIG. 19, as shown in FIG. 20B, the DMA controller 305 reads out the lowermost line of the current tile (5) and the tile (6) that is one level below the tile (5), and replaces the tile image data of the line buffer 701. It is thereby possible to maintain a state in which the line of interest and overwrap data for blend processing is continuously stored in the line buffer 701 while continuing processing.

As described above, according to the present embodiment, in addition to the advantages of the above-described embodiment, it is possible to reduce the height of the line buffer 701.

Further, according to the present embodiment, when a color image forming apparatus includes a plurality of developing units that correspond to each of a plurality of colors (CYMK), color shifting caused by registration errors for each individual color can be prevented by adopting the above-described configuration for each individual color.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer, for example, via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-277040, filed Dec. 4, 2009, which is hereby incorporated by reference herein in its entirety.

The invention claimed is:

1. An image forming apparatus for forming an image by performing exposure scanning of an image carrier, comprising:
   an image memory configured to store image data in block units obtained by dividing image data into a plurality of blocks;
   a skew information storing unit configured to store skew information that indicates a skew with respect to the image carrier of a main scan line used in the exposure scanning;
   an image data storing unit configured to store image data having a width in a sub-scanning direction equivalent to a certain number of amounts of the image data and a width in a main-scanning direction equivalent to amounts of the image data of a single main scan;
   a specifying unit configured to specify, in accordance with the skew information, a block in which a scan line of image data that is a scanning target and that is stored in the image memory is located;
   a readout unit configured to read out image data that is stored in the image memory in block units from the specified block;
   a moving unit configured to move the block in which the scan line of image data that is the scanning target is located, in a sub-scanning direction, when storing image data in block units that is read out by the readout unit, to the image data storing unit;
   a block information storing unit configured to store block information indicating a block position to which the block has been moved by the moving unit and a moving direction of the block at the block position;
   an output control unit configured to read out image data from a block of image data stored in the image data storing unit in the main-scanning direction, adjust a position in the sub-scanning direction of image data of the scan line based on the block information stored in the block information storing unit and, the skew information stored in the skew information storing unit, and output an amount of image data that is obtained by the single main scan;
   an exposure unit configured to expose the image carrier with irradiation light in accordance with the image data of the amount obtained by the single main scan that is output by the output control unit; and
   a replacing unit configured to, when a block unit of image data stored in the image data storing unit is output by the output control unit, replace the processed block unit of image data with another block unit of image data that is located in predetermined levels below a processed tile in the image memory by the readout unit and the size of which corresponds to the size of the processed block unit of image data.

2. The apparatus according to claim 1, wherein the skew information includes at least information indicating a position at which image data corresponding to the main scan line moves to another line in accordance with the skew of the main scan line, and information indicating a moving direction in a sub-scanning direction at the position.

3. The apparatus according to claim 1, wherein when storing image data in block units that is read out with the readout unit to the image data storing unit, if the block, in which is located the scan line of image data that is the scanning target, does not move in a sub-scanning direction, the block information storing unit does not store the block information.

4. The apparatus according to claim 1, wherein when the certain number is an integral multiple of the length in the sub-scanning direction of the block, in a case where a block of image data stored in the image data storing unit is output by the output control unit and becomes a processed block, the replacing unit is further configured to replace the block stored in the image data storing unit with data of a block that is located at a position that is separated from the block in the image memory by an amount of blocks of the certain number in the sub-scanning direction.

5. The apparatus according to claim 1, wherein when the certain number is not an integral multiple of the length in the sub-scanning direction of the block, and a lowermost line of image data stored in the image data storing unit includes image data that is a processing target, the replacing unit is further configured to replace corresponding image data of the image data storing unit using a block of image data in the image memory to which the lowermost line belongs and image data of a block of image data in the image memory that is adjacent to the block in the sub-scanning direction.

6. A control method of an image forming apparatus for forming an image by performing exposure scanning of an image carrier, and which includes an image memory configured to store image data in block units obtained by dividing image data into a plurality of blocks, a skew information storing unit configured to store skew information that indicates a skew with respect to the image carrier of a main scan line that performs exposure scanning, and an image data storing unit configured to store image data having a width in a sub-scanning direction equivalent to a certain number of amounts of the image data and a width in a main-scanning direction equivalent to amounts of the image data of a single main scan, the method comprising:
   specifying, in accordance with the skew information, a block in which a scan line of image data that is a scanning target and that is stored in the image memory is located and reading out image data stored in the image memory in block units from the specified block specified in accordance with the skew information;
   moving the block, in which the scan line of image data that is the scanning target is located, in a sub-scanning direction, when storing image data in block units that is read out by the reading out step to the image data storing unit;
   storing block information indicating a block position to which the block has been moved in the moving step and a moving direction of the block at the block position;
   reading out image data from a block of image data stored in the image data storing unit in the main-scanning direction, adjusting a position in the sub-scanning direction of image data of the scan line based on the block information stored in the block information storing step, and the skew information stored in the skew information storing unit, and outputting an amount of image data that is obtained by the single main scan;
   exposing the image carrier with irradiation light in accordance with the image data of the amount obtained by the single main scan that is output at the outputting step; and
   when a block unit of image data stored in the image data storing unit is output at the reading out step, replacing, once, the processed block unit of image data with another block unit of image data that is located in predetermined levels below a processed tile in the image memory at the reading-out step and the size of which corresponds to the size of the processed block unit of image data.

* * * * *